United States Patent
Matsumoto

(10) Patent No.: US 7,725,575 B2
(45) Date of Patent: May 25, 2010

(54) UNEXPECTED DEMAND DETECTION SYSTEM AND UNEXPECTED DEMAND DETECTION PROGRAM

(75) Inventor: Yasuhide Matsumoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1128 days.

(21) Appl. No.: 11/359,494

(22) Filed: Feb. 23, 2006

(65) Prior Publication Data

US 2007/0130357 A1 Jun. 7, 2007

(30) Foreign Application Priority Data

Oct. 27, 2005 (JP) ............................. 2005-312965

(51) Int. Cl.
*G06F 15/173* (2006.01)
(52) U.S. Cl. ........................ 709/224; 709/226; 709/203; 718/104; 705/8; 370/230
(58) Field of Classification Search ................. 709/203, 709/224, 226, 229; 718/102, 104; 705/8; 370/230
See application file for complete search history.

(56) References Cited

U.S. PATENT DOCUMENTS

| | | | | |
|---|---|---|---|---|
| 6,424,993 | B1 * | 7/2002 | Weber | 709/203 |
| 6,590,865 | B1 * | 7/2003 | Ibaraki et al. | 370/230 |
| 7,328,167 | B1 * | 2/2008 | Kusama et al. | 705/5 |
| 7,526,765 | B2 * | 4/2009 | Lin et al. | 718/102 |
| 2003/0028642 | A1 * | 2/2003 | Agarwal et al. | 709/226 |
| 2006/0282588 | A1 * | 12/2006 | Proujansky-Bell | 710/240 |

FOREIGN PATENT DOCUMENTS

| | | |
|---|---|---|
| JP | 7 334235 | 12/1995 |
| JP | 2001 324576 | 11/2001 |
| JP | 2002 259672 | 9/2002 |
| JP | 2004 157625 | 6/2004 |

* cited by examiner

*Primary Examiner*—Salad Abdullahi
*Assistant Examiner*—El Hadji M Sall
(74) *Attorney, Agent, or Firm*—Westerman, Hattori, Daniels & Adrian, LLP

(57) ABSTRACT

An unexpected demand detection system for detecting an unexpected demand for IT resources includes: a demand model recording part that records a demand model representing a time-based transition in a predetermined time period of a required amount of the IT resources; an unexpected demand model recording part that records an unexpected demand model representing a time-based transition different from the time-based transition of the amount of the IT resources represented by the demand model; and a judging part that performs a comparison among observation data indicating an actual demand for the IT resources observed in the predetermined time period, the amount of the IT resources represented by the demand model, and an amount of the IT resources represented by the unexpected demand model thereby to judge whether an unexpected demand represented by the unexpected demand model occurs.

2 Claims, 26 Drawing Sheets

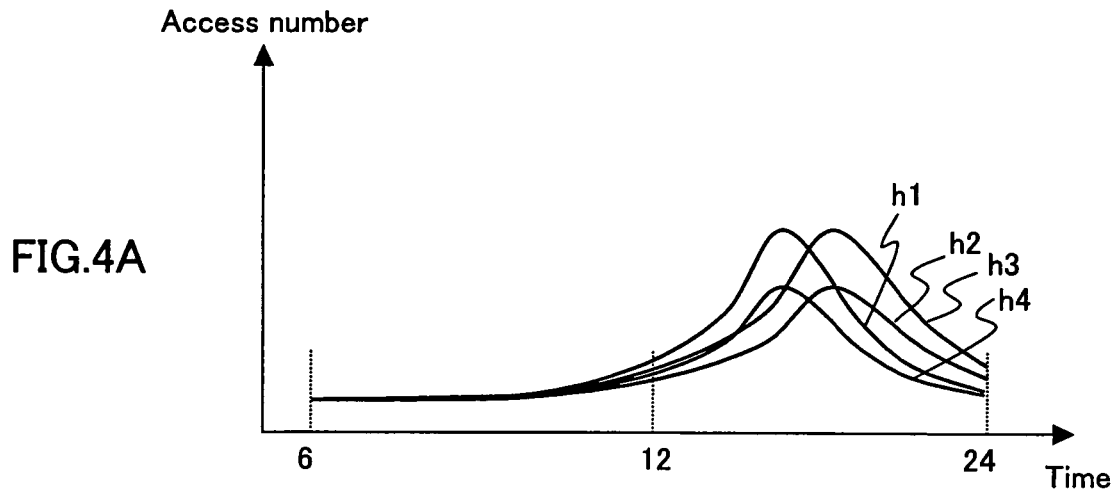
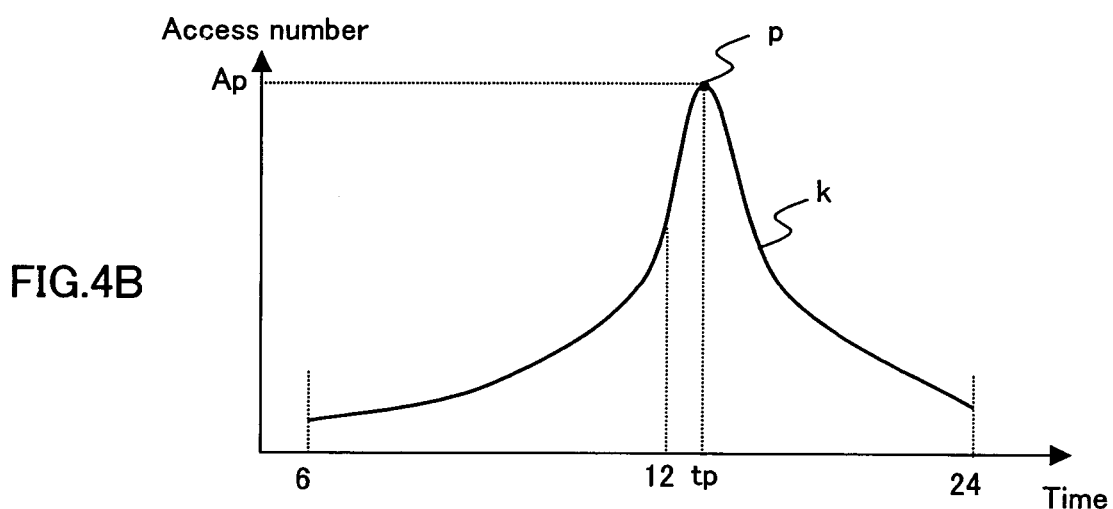
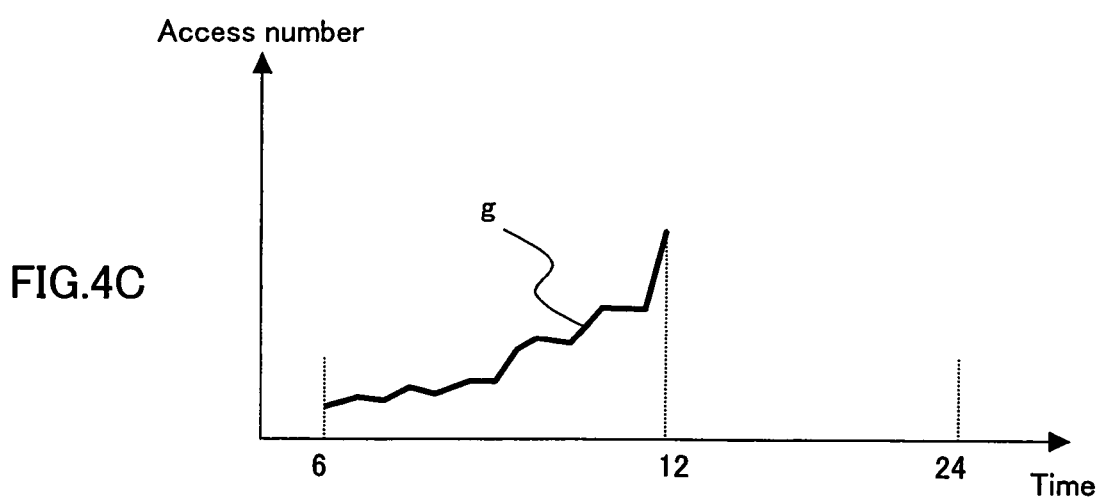

| Time | 6:00 | 7:00 | 8:00 | 9:00 | 10:00 | ... | 24:00 |
|---|---|---|---|---|---|---|---|
| Standard deviation | 900 | 1100 | 2000 | 1300 | 1250 | ... | 950 |

| Scale (kurtosis) | Detection margin time (min) | | | | |
| --- | --- | --- | --- | --- | --- |
| | 80 | 90 | 100 | 110 | 120 |
| 2 | 14.15412 | 23.00706 | 37.60497 | 61.67401 | 101.3578 |
| 3 | 4.11535 | 5.533831 | 7.516825 | 10.28671 | 14.15412 |
| 4 | 2.381098 | 2.898284 | 3.566145 | 4.42664 | 5.533831 |
| -5 | 1.788732 | 2.053737 | 2.381098 | 2.783954 | 3.278474 |
| 10 | 1.168717 | 1.216543 | 1.27154 | 1.334259 | 1.405328 |

FIG.13

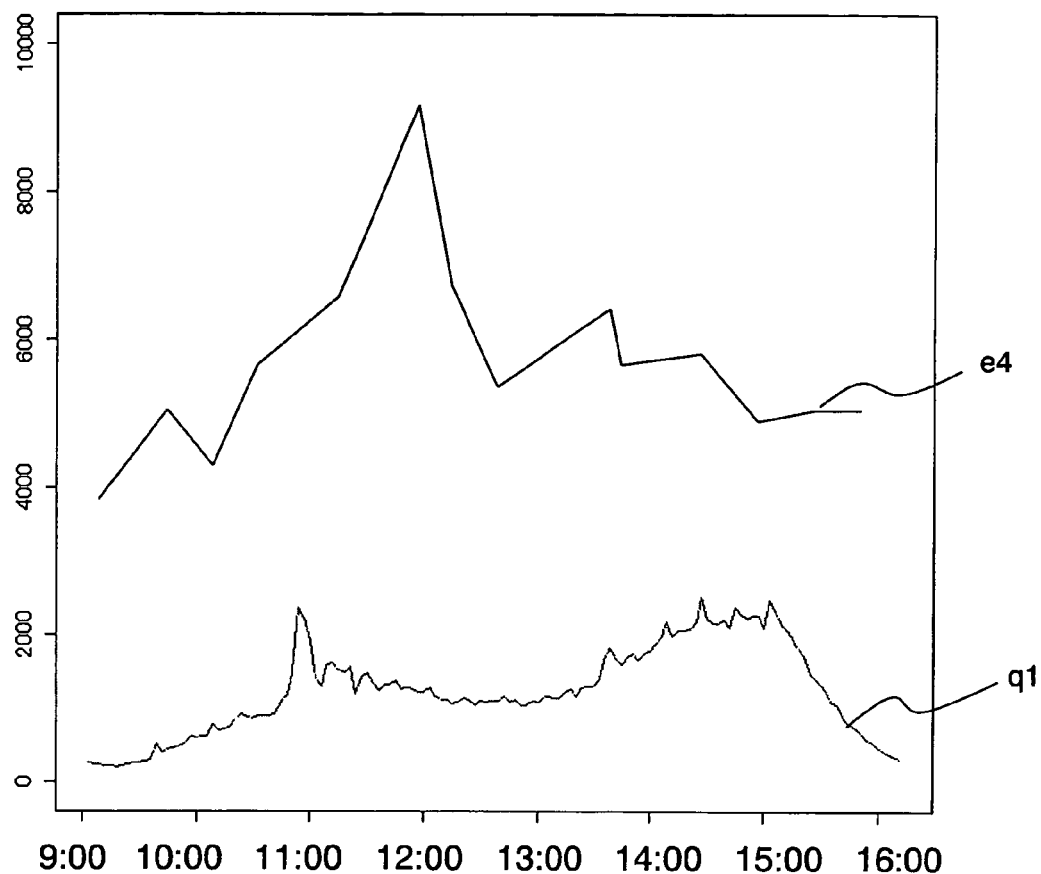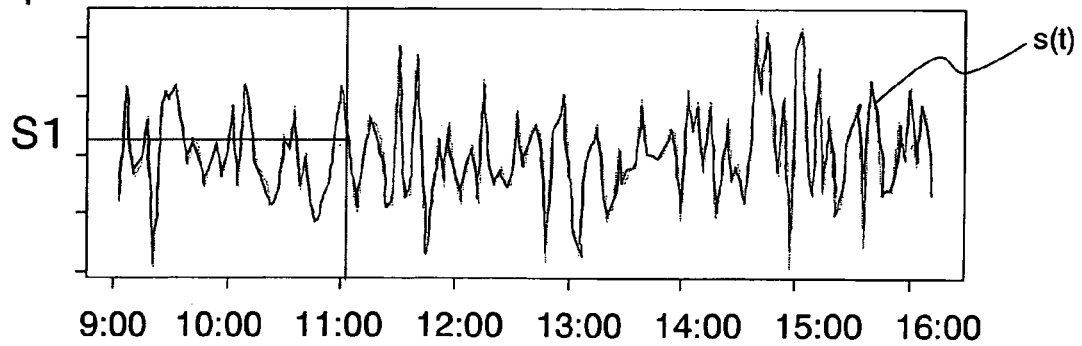
FIG.16

UNEXPECTED DEMAND DETECTION SYSTEM AND UNEXPECTED DEMAND DETECTION PROGRAM

BACKGROUND OF THE INVENTION

1. Field of the Invention

The present invention relates to an unexpected demand detection system and an unexpected demand detection program that allow the detection of an unexpected demand for IT (Information Technology) resources that can be increased/decreased in a system composed of the IT resources.

2. Description of Related Art

In a facility such as, for example, an Internet data center (hereinafter, referred to as an IDC), IT resources are operated in each of business systems managed by a plurality of management entities. The IDC takes control of the IT resources including a server, a storage, a network and the like that constitute each of the business systems, and provides circuits for connection to the Internet, maintenance service, management service and the like.

Particularly, an IDC that is capable of increasing/decreasing IT resources allocated to business systems in an on-demand manner according to a demand is referred to as a utility type IDC. In the utility type IDC, it is requested that the IT resources in the plurality of business systems be used efficiently.

Therefore, in the utility type IDC, it is particularly important to forecast a demand for the IT resources accurately so as to improve the use efficiency of the IT resources based on this demand forecasting. As technologies for forecasting future demands based on past usage records, there are many methods such as a method using multiple regression analysis and a method using an autoregressive model such as ARIMA (Autoregressive Integrated Moving Average Model). Further, as described in JP 2002-259672 A, for example, as a forecasting method directed to the field of marketing, a method is known in which behavior patterns of users are classified into a plurality of behavior classes.

Management entities of the business systems can manage the business systems in the following manner. That is, for example, based on a forecasted demand for the IT resources, a management policy is generated that is data specifying when and how much the IT resources are to be increased/decreased, and the IT resources are increased/decreased based on the management policy.

By the use of such a management policy, for example, in the case where the number of accesses from users to a Web site provided by a business system is forecasted to increase to a maximum number of 10,000 to 15,000 during a time period between 10:00 and 17:00 on the 12$^{th}$ of October due to the occurrence of an event such as a campaign, it is possible to add an IT resource so as to correspond to the time period of an increase in the access number.

SUMMARY OF THE INVENTION

However, an actual demand for IT resources may behave in an unexpected manner to exceed a forecasted demand. In such a case, if information on the possibility that an actual demand for IT resources varies from a forecasted demand is obtained, a demand exceeding the forecasted demand can be met appropriately. For example, a management entity can reduce a risk incurred by an unexpected demand by modifying a plan for a campaign or a management policy.

It is an object of the present invention to provide an unexpected demand detection system and an unexpected demand detection program that can provide information on the possibility that an actual demand for IT resources varies from a forecasted demand.

An unexpected demand detection system according to the present invention is an unexpected demand detection system for detecting an unexpected demand for IT resources that can be increased/decreased in a computer system including the IT resources. The unexpected demand detection system includes: a demand model recording part that records a demand model representing a time-based transition in a predetermined time period of an amount of the IT resources required in the computer system by using data indicating a time in the predetermined time period and data indicating an amount of the IT resources required at the time; an unexpected demand model recording part that records an unexpected demand model representing a time-based transition different from the time-based transition of the amount of the IT resources represented by the demand model by using data indicating a time in the predetermined time period and data indicating an amount of the IT resources required at the time; and a judging part that performs a comparison among observation data indicating an actual demand for the IT resources observed in the predetermined time period, the amount of the IT resources represented by the demand model, and the amount of the IT resources represented by the unexpected demand model thereby to judge whether an unexpected demand represented by the unexpected demand model occurs in the predetermined time period.

An unexpected demand detection program according to the present invention is an unexpected demand detection program for allowing a computer to perform a process of detecting an unexpected demand for IT resources that can be increased/decreased in a computer system including the IT resources. The unexpected demand detection program allows the computer to perform: a demand model reading process of reading out, from a recording part provided in the computer, a demand model representing a time-based transition in a predetermined time period of an amount of the IT resources required in the computer system by using data indicating a time in the predetermined time period and data indicating an amount of the IT resources required at the time; an unexpected demand model reading process of reading out, from the recording part, an unexpected demand model representing a time-based transition different from the time-based transition of the amount of the IT resources represented by the demand model by using data indicating a time in the predetermined time period and data indicating an amount of the IT resources required at the time; and a judging process of performing a comparison among observation data indicating an actual demand for the IT resources observed in the predetermined time period, the amount of the IT resources represented by the demand model, and the amount of the IT resources represented by the unexpected demand model thereby to judge whether an unexpected demand represented by the unexpected demand model occurs in the predetermined time period.

According to the present invention, an unexpected demand detection system and an unexpected demand detection program that can provide information on the possibility that an actual demand for IT resources varies from a forecasted demand can be provided.

BRIEF DESCRIPTION OF THE DRAWINGS

FIG. 4A is a graph showing an example of a transition of the number of accesses represented by a demand model 51, FIG. 4B is a graph showing an example of a transition of the number of accesses represented by an unexpected demand model 52, and FIG. 4C is a graph showing an example of a transition of the number of accesses indicated by the observation data 26.

FIG. 13 is a diagram showing an example of a data structure of event metrics 25.

FIG. 16 illustrates graphs showing an example of steepness s that varies with time, a time-based transition of a standard deviation, and a transition of an acceptable number of accesses.

DETAILED DESCRIPTION OF THE INVENTION

Figure 1A:
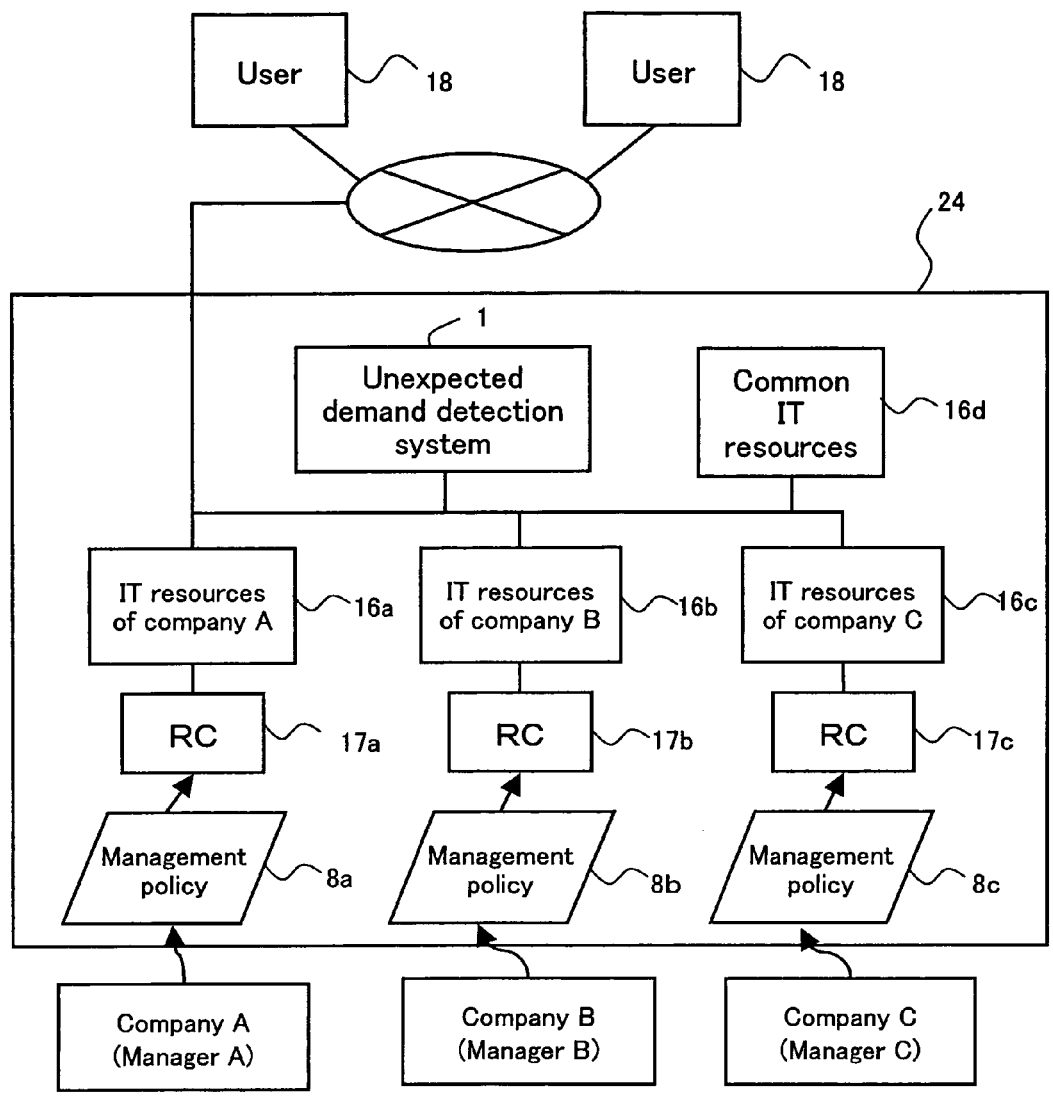
FIG. 1A is schematic diagram showing a system configuration of a utility type IDC.

The "IT resource" refers to hardware and/or software for configuring a system. Examples of the IT resource include a server, middleware, a network, a storage, various terminals (a personal computer, a PDA, a mobile phone and the like), a RFID tag and the like. The IT resource is referred to also as an "IT asset".

An unexpected demand detection system according to the present invention is an unexpected demand detection system for detecting an unexpected demand for IT resources that can be increased/decreased in a computer system including the IT resources. The unexpected demand detection system includes: a demand model recording part that records a demand model representing a time-based transition in a predetermined time period of an amount of the IT resources required in the computer system by using data indicating a time in the predetermined time period and data indicating an amount of the IT resources required at the time; an unexpected demand model recording part that records an unexpected demand model representing a time-based transition different from the time-based transition of the amount of the IT resources represented by the demand model by using data indicating a time in the predetermined time period and data indicating an amount of the IT resources required at the time; and a judging part that performs a comparison among observation data indicating an actual demand for the IT resources observed in the predetermined time period, the amount of the IT resources represented by the demand model, and the amount of the IT resources represented by the unexpected demand model thereby to judge whether an unexpected demand represented by the unexpected demand model occurs in the predetermined time period.

The judging part performs a comparison among the observation data, the unexpected demand model and the demand model, and thus can detect that an actual demand for IT resources indicated by the observation data varies from a time-based transition represented by the demand model and makes a transition approximate to a time-based transition represented by the unexpected demand model. When this transition is detected, the judging part judges that a demand represented by the unexpected demand model occurs. Thus, the occurrence of an unexpected demand is detected in advance. As a result, a management entity of the system can obtain information on the possibility that an actual demand for the IT resources varies from a forecasted demand. This allows preventive measures to be taken with respect to an unexpected demand.

Preferably, the unexpected demand detection system according to the present invention further includes an addition information generating part that, when the judging part judges that the unexpected demand occurs, generates, based on the unexpected demand model, additional IT resource information indicating an amount of an IT resource to be added so as to meet the demand and a time period for adding the IT resource. According to this configuration, based on the additional IT resource information generated by the addition information generating part, a management entity of the system can obtain information on "when" and "how much" an IT resource to be added is required with respect to an unexpected demand.

Preferably, the unexpected demand detection system according to the present invention further includes: a cost recording part that records cost data indicating a cost for adding the IT resource; and a cost calculating part that calculates, based on the cost data, a cost for adding the IT resource indicated by the additional IT resource information generated by the addition information generating part. According to this configuration, a management entity of the system can obtain information regarding a cost for adding an IT resource with respect to an unexpected demand. As a result, the management entity can study how to meet the unexpected demand in consideration of the cost.

Preferably, in the unexpected demand detection system according to the present invention, the IT resource is provided by a data center system that provides IT resources to the computer system, and the unexpected demand detection system further includes: a supply data recording part that records supply data indicating a time-based transition of an available supply amount of an IT resource that can be supplied by the data center system; and an unexpected demand model generating part that generates, based on the supply data, the unexpected demand model such that a peak of a demand for the IT resources is reached in a time period in which the available supply amount is insufficient.

The judging part performs the judgment using the unexpected demand model generated by the unexpected demand model generating part, and thus can judge whether an unexpected demand occurs that peaks in a time period in which an available supply amount of an IT resource in the data center system is insufficient.

Preferably, in the unexpected demand detection system according to the present invention, the supply data is data generated based on data regarding an amount of an IT resource that has been supplied previously in the data center system. According to this configuration, the unexpected demand model generating part can generate the unexpected demand model using the supply data that reflects a transition pattern of an amount of a supply that has been provided previously.

Preferably, in the unexpected demand detection system according to the present invention, the supply data is data generated based on a management policy as data indicating an amount of an IT resource to be required in future in the computer system supplied with the IT resources by the data center system. According to this configuration, the unexpected demand model generating part can generate the unexpected demand model using the supply data that reflects a transition pattern of a supply amount forecasted based on the management policy in the computer system.

An unexpected demand detection system according to the present invention is an unexpected demand detection system for detecting an unexpected demand for IT resources that can be increased/decreased in a computer system including the IT resources. The unexpected demand detection system includes: an event information recording part that records a value indicating a ratio between, with respect to a demand for the IT resources that varies due to occurrence of an event, a demand amount at a time when a peak of the demand is reached and a demand amount at a point in time preceding or following the peak time by a length of a detection margin time correspondingly to a plurality of values indicating steepness of a variation in the demand for the IT resources and a plurality of lengths of the detection margin time; a reference value data recording part that records reference value data indicating a time-based transition in a predetermined time period of a reference value for judging presence or absence of a variation in the demand for the IT resources due to occurrence of an event; an analysis data recording part that records data indicating a value of the steepness regarding an event as a subject to be analyzed and data indicating a length of the detection margin time for the subject; and an acceptable amount data generating part that acquires, from the event information recording part, a value of the ratio corresponding to the value of the steepness and the length of the detection margin time for the subject that are recorded in the analysis data recording part, and determines, using the value of the ratio and a value of the reference value at a time in the predetermined time period indicated by the reference value data, a peak value of the demand that can be detected after a lapse of the length of the detection margin time from the time as acceptable amount data indicating a demand amount that can be handled in the length of the detection margin time.

The steeper a variation in demand for IT resources due to the occurrence of an event, the shorter a detection margin time for handling the variation. Further, the larger an increase in demand for IT resources due to the occurrence of an event, the shorter a detection margin time. In the event information recording part, data is recorded that indicates relationships among these values, namely, steepness of a variation in demand due to an event, an amount of the variation in demand, and a detection margin time. The acceptable amount data generating part acquires, from the event information recording part, a value of the ratio corresponding to a value of steepness regarding a subject to be analyzed and a length of a detection margin time for the subject that are recorded in the analysis data recording part. Moreover, using a reference value at a time in the predetermined time period indicated by the reference value data, the acceptable amount data generating part determines a peak value of a demand that can be detected after a lapse of the length of the detection margin time from the time. This peak value is detected in the length of the detection margin time and indicates a demand amount that can be handled, and thus the acceptable amount data generating part can calculate this peak value as the acceptable amount data indicating the demand amount that can be handled in length of the detection margin time.

For example, by determining the peak value with respect to each value of the reference value that makes a transition in the predetermined time period, the available amount data generating part can obtain a time-based transition of an amount of a demand for IT resources that can be handled in the predetermined time period.

Preferably, the unexpected demand detection system according to the present invention further includes: a management policy recording part that records a management policy containing data indicating an increase/decrease in amount of the IT resources in the computer system that is caused in the predetermined time period; and a risk calculating part that performs a comparison between the increase/decrease in amount of the IT resources that is caused in the predetermined time period, which is indicated by the management policy, and the demand amount indicated by the acceptable amount data thereby to generate data indicating magnitude of a risk in a case where a demand occurs that cannot be met using the IT resources provided based on the management policy.

By performing a comparison between an increase/decrease in amount of IT resources according to the management policy and a demand amount indicated by the acceptable amount data, the risk calculating part can determine the magnitude of the possibility that a demand occurs in the predetermined time period, which cannot be met using the IT resources provided based on the management policy. Thus, it is possible to generate data indicating the magnitude of a risk in the case where a demand that cannot be met occurs.

Preferably, the unexpected demand detection system according to the present invention includes: a demand model recording part that records a demand model representing a time-based transition in a predetermined time period of an amount of the IT resources required in the computer system by using data indicating a time in the predetermined time period and data indicating an amount of the IT resources required at the time; an unexpected demand model generating part that generates an unexpected demand model representing a time-based transition of a demand for the IT resources whose peak falls outside a range of a demand amount that can be handed in a predetermined length of the detection margin time, which is indicated by the acceptable amount data; and a judging part that performs a comparison among observation data indicating an actual demand for the IT resources at an observation time in the predetermined time period, an amount of the IT resources at the observation time represented by the demand model, and an amount of the IT resources at the observation time represented by the unexpected demand model thereby to judge whether the unexpected demand represented by the unexpected demand model occurs in the predetermined time period.

The judging part performs the judgment using the unexpected demand model generated by the unexpected demand model generating part, and thus can judge whether an unexpected demand occurs that has a peak falling outside a range of a demand amount that can be handled in a predetermined length of the detection margin time.

An unexpected demand detection system according to the present invention is an unexpected demand detection system for detecting an unexpected demand for IT resources that can be increased/decreased in a computer system including the IT resources. The unexpected demand detection system includes: an event information recording part that records a value indicating a ratio between, with respect to a demand for the IT resources that varies due to occurrence of an event, a demand amount at a time when a peak of the demand is reached and a demand amount at a point in time preceding or following the peak time by a length of a detection margin time correspondingly to a plurality of values indicating steepness of a variation in the demand for the IT resources and a plurality of lengths of the detection margin time; a reference value data recording part that records reference value data indicating a time-based transition in a predetermined time period of a reference value for judging presence or absence of a variation in the demand for the IT resources due to occurrence of an event; a forecast data recording part that records forecast data containing data indicating a value of the steepness of a variation in the demand for the IT resources due to an envisioned event and data indicating a time period in the predetermined time period, in which a peak of the demand for the IT resources that varies due to the envisioned event is reached, and a demand amount at a peak time; a detection period generating part that acquires, using the value of the steepness, the time period in which the peak of the demand is reached, and the demand amount at the peak time that are indicated by the forecast data, a demand amount at a point in time preceding the peak time by a length of the detection margin time from the event information recording part, and performs a comparison between the acquired demand amount and the reference value data thereby to calculate a detection period in which a start of the variation in the demand due to the envisioned event is detected; an observation data input part that inputs observation data indicating an actual demand for the IT resources observed in the predetermined time period; and a judging part that performs a comparison between the actual demand indicated by the observation data and the reference value data so as to detect a start of a variation in the demand due to an event, and performs a comparison between a time period in which the start is detected and the detection period calculated by the detection period generating part thereby to judge whether a demand different from the demand indicated by the forecast data occurs in the predetermined time period.

Using the forecast data and information from the event information recording part, the detection period generating part calculates a detection period in which a start of a variation in a demand due to an envisioned event is forecasted to be detected. By performing a comparison between the detection period generated by the detection period generating part and a time period in which a start of a variation in the demand due to an actual event indicated by the observation data is detected, the judging part can judge whether a demand different from a demand indicated by the forecast data occurs. Thus, the occurrence of an unexpected demand is detected in advance.

An unexpected demand detection program recorded in a recording medium according to the present invention is an unexpected demand detection program for allowing a computer to perform a process of detecting an unexpected demand for IT resources that can be increased/decreased in a computer system including the IT resources. The unexpected demand detection program allows the computer to perform: a demand model reading process of reading out, from a recording part provided in the computer, a demand model representing a time-based transition in a predetermined time period of an amount of the IT resources required in the computer system by using data indicating a time in the predetermined time period and data indicating an amount of the IT resources required at the time; an unexpected demand model reading process of reading out, from the recording part, an unexpected demand model representing a time-based transition different from the time-based transition of the amount of the IT resources represented by the demand model by using data indicating a time in the predetermined time period and data indicating an amount of the IT resources required at the time; and a judging process of performing a comparison among observation data indicating an actual demand for the IT resources observed in the predetermined time period, the amount of the IT resources represented by the demand model, and the amount of the IT resources represented by the unexpected demand model thereby to judge whether an unexpected demand represented by the unexpected demand model occurs in the predetermined time period.

An unexpected demand detection program recorded in a recording medium according to the present invention is an unexpected demand detection program for allowing a computer to perform a process of detecting an unexpected demand for IT resources that can be increased/decreased in a computer system including the IT resources. The unexpected demand detection program allows the computer to perform: a reference value data reading process of reading out, from a recording part provided in the computer, reference value data indicating a time-based transition in a predetermined time period of a reference value for judging presence or absence of a variation in a demand for the IT resources due to occurrence of an event; an analysis data reading process of reading out, from the recording part, data indicating a value of steepness regarding an event as a subject to be analyzed and data indicating a length of a detection margin time for the subject; an acquiring process of accessing an event information recording part in which a value indicating a ratio between, with respect to the demand for the IT resources that varies due to occurrence of an event, a demand amount at a time when a peak of the demand is reached and a demand amount at a point in time preceding or following the peak time by a length of the detection margin time is recorded correspondingly to a plurality of values indicating the steepness of a variation in the demand for the IT resources and a plurality of lengths of the detection margin time thereby to acquire, from the event information recording part, a value of the ratio corresponding to the value of the steepness and the length of the detection margin time for the subject that are read out in the analysis data reading process; and an acceptable amount data generating process of determining, using the value of the ratio and a value of the reference value at a time in the predetermined time period indicated by the reference value data, a peak value of the demand that can be detected after a lapse of the length of the detection margin time from the time as acceptable amount data indicating a demand amount that can be handled in the length of the detection margin time.

An unexpected demand detection program recorded in a recording medium according to the present invention is an unexpected demand detection program for allowing a computer to perform a process of detecting an unexpected demand for IT resources that can be increased/decreased in a computer system including the IT resources. The unexpected demand detection program allows the computer to perform: a reference value data reading process of reading out, from a recording part provided in the computer, reference value data indicating a time-based transition in a predetermined time period of a reference value for judging presence or absence of a variation in a demand for the IT resources due to occurrence of an event; a forecast data reading process of reading out, from the recording part, forecast data containing data indicating a value of steepness of a variation in the demand for the IT resources due to an envisioned event and data indicating a time period in the predetermined time period, in which a peak of the demand for the IT resources that varies due to the envisioned event is reached, and a demand amount at a peak time; an acquiring process of accessing an event information recording part in which a value indicating a ratio between, with respect to the demand for the IT resources that varies due to occurrence of an event, a demand amount at a time when a peak of the demand is reached and a demand amount at a point in time preceding or following the peak time by a length of a detection margin time is recorded correspondingly to a plurality of values indicating the steepness of a variation in the demand for the IT resources and a plurality of lengths of the detection margin time thereby to acquire, using the value of the steepness, the time period in which the peak of the demand is reached, and the demand amount at the peak time that are indicated by the forecast data, a demand amount at a point in time preceding the peak time by a length of the detection margin time from the event information recording part; a detection period generating process of performing a comparison between the demand amount acquired in the acquiring process and the reference value data thereby to calculate a detection period in which a start of the variation in the demand due to the envisioned event is detected; an observation data inputting process of inputting observation data indicating an actual demand for the IT resources observed in the predetermined time period; and a judging process of performing a comparison between the actual demand indicated by the observation data and the reference value data so as to detect a start of a variation in the demand due to an event, and performing a comparison between a time period in which the start is detected and the detection period calculated in the detection period generating process thereby to judge whether a demand different from the demand indicated by the forecast data occurs in the predetermined time period.

The following describes one embodiment of the present invention in detail with reference to the appended drawings.

Embodiment 1

Embodiment 1 relates to an unexpected demand detection system for detecting an unexpected demand for IT resources managed in a utility type IDC. This embodiment describes as an example a case where in a utility type IDC, a plurality of IT resource managers manage business systems for providing users with services via the Internet by using their own IT resources, respectively.

(Configuration of an IDC)

FIG. 1A is schematic diagram showing a system configuration of a utility type IDC. In an IDC 24 shown in FIG. 1A, IT resources 16a, 16b and 16c are managed that are owned by companies A, B and C, respectively. In this embodiment, the IT resources 16a of the company A includes, for example, a server, a storage and a network for building a business system and software that operates these components. That is, a plurality of users 18 access the server included in the IT resources 16a to use business services provided by the company A. Thus, the company A as a manager can make a profit.

An unexpected demand detection system 1 is provided in the IDC 24. The unexpected demand detection system 1 is connected to the IT resources 16a, 16b and 16c.

Furthermore, common IT resources 16d are provided in the IDC 24. The common IT resources 16d can be lent to the companies A, B and C. For example, when temporarily increasing the IT resources 16a of the company A, a portion of the common IT resources 16d is allocated to the IT resources 16a of the company A. Further, when there is an excess in the IT resources 16a of the company A, the excess can be used as the common IT resources 16d. Accordingly, the companies A, B and C can increase/decrease the IT resources 16a, 16b and 16c, respectively, according to circumstances.

In the IT resources 16a, 16b and 16c of the companies A, B and C, resource coordinators (hereinafter, referred to as "RCs") 17a, 17b and 17c are deployed, respectively. For example, the RC 17a reads a management policy 8a set by the company A and increases/decreases the IT resources 16a in accordance with the contents of the management policy 8a.

The management policies 8a, 8b and 8c are information indicating managing rules set to control business systems that constitute the IT resources 16a, 16b and 16c, respectively. The management policies 8a, 8b and 8c describe rules for determining an increase/decrease of the IT resources 16a, 16b and 16c, respectively. For example, the management policy 8a describes data indicating a time period for adding an IT resource to the IT resources 16a and an amount of the IT resource to be added. Further, the management policies 8a, 8b and 8c may be written, for example, following an IF-THEN rule stipulating that a predetermined process is performed when a predetermined condition is satisfied.

In FIG. 1A, only three companies are shown to operate business systems in the IDC 24 for the sake of explanation. However, in the IDC 24, there actually are more companies owing IT resources to operate their own business systems.

Figure 1B:
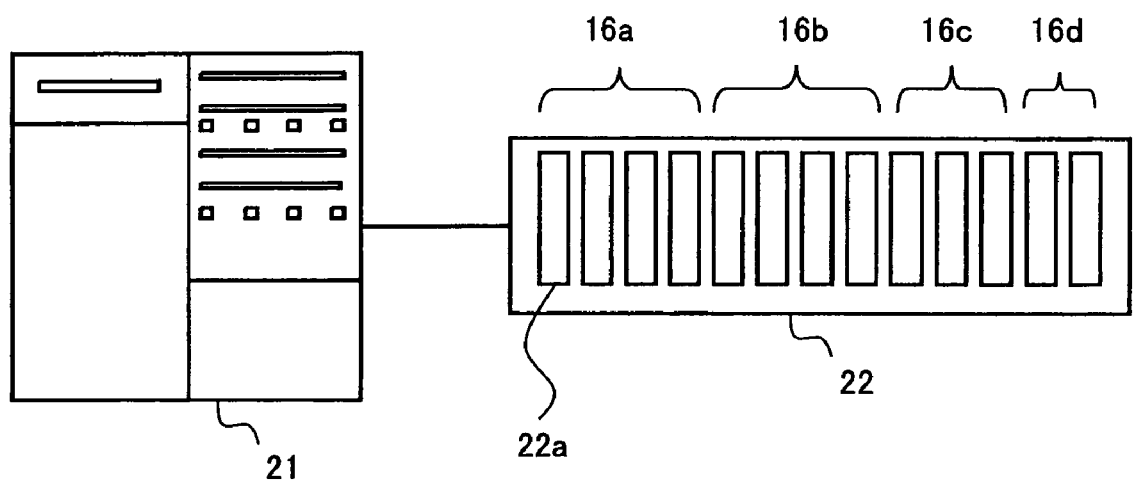
FIG. 1B is a diagram showing an example of physical configurations of an unexpected demand detection system 1 and IT resources 16a, 16b and 16c.

FIG. 1B is a diagram showing an example of physical configurations of the unexpected demand detection system 1 and the IT resources 16a, 16b and 16c. As shown in FIG. 1B, the unexpected demand detection system 1 and the IT resources 16a, 16b and 16c are formed of, for example, a blade server 22 including a plurality of server blades 22a and a deployment server 21 that manages the blade server 22. The blade server 22 and the deployment server 21 are connected to each other by means of a LAN, for example. The unexpected demand detection system 1 can be built on the deployment server 21. The plurality of server blades 22a in the single blade server 22 are allocated to, for example, the IT resources 16a, the IT resources 16b, the IT resources 16c, and the common IT resources 16d, respectively. The RCs 17a, 17b and 17c can be operated on the deployment server 21.

For example, when adding one server in the business system constituted by the IT resources 16a, one server blade 22a is added that is to be allocated to the IT resources 16a of the company A in the blade server 22. The IT resources 16a, 16b, 16c, and 16d also may be formed of physically separate blade servers.

(Configuration of the Unexpected Demand Detection System)

Figure 2:
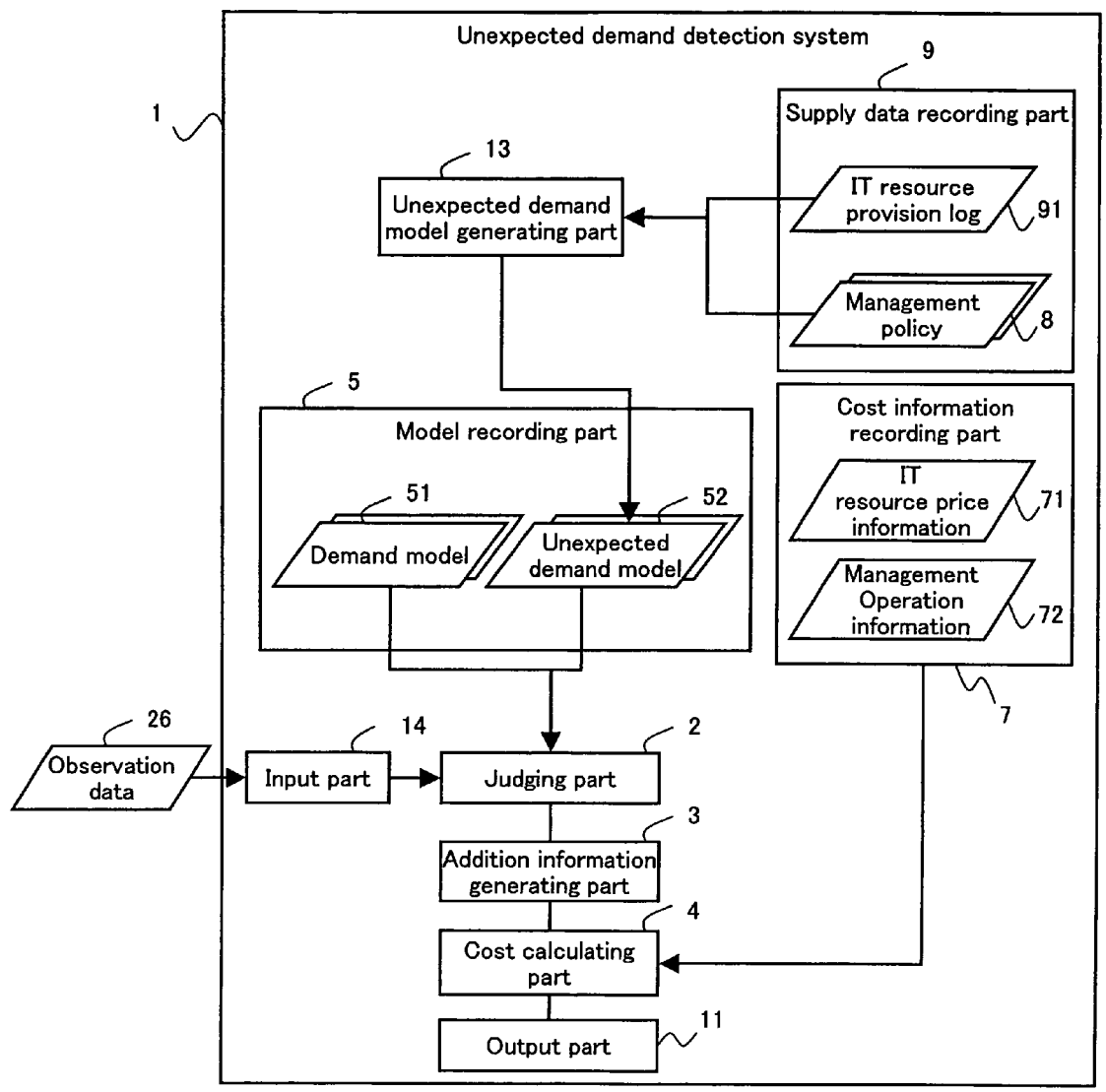
FIG. 2 is a functional block diagram showing a configuration of the unexpected demand detection system 1.

FIG. 2 is a functional block diagram showing a configuration of the unexpected demand detection system 1. The unexpected demand detection system 1 includes a judging part 2, an addition information generating part 3, a cost calculating part 4, an output part 11, an unexpected demand model generating part 13, an input part 14, a model recording part 5, a cost information recording part 7, and a supply data recording part 9.

In the model recording part 5, a demand model 51 and an unexpected demand model 52 are recorded. Preferably, the demand model 51 and the unexpected demand model 52 are recorded with respect to each of the IT resources 16a, 16b and 16c that are managed in the IDC 24. The unexpected demand model 52 is generated by the unexpected demand model generating part 13 and recorded in the model recording part 5.

The demand model 51 is data indicating a time-based transition in a predetermined time period of an amount of the IT resources required in each of the business systems constituted by the IT resources 16a, 16b and 16c, respectively. The time-based transition is represented by, for example, data indicating a time in the predetermined time period and data indicating an amount of the IT resources required at that time. The amount of the IT resources can be represented by, for example, an amount of information that is processed by the IT resources. Examples of the data indicating an amount of the IT resources include data indicating the number of Web accesses to a server, the number of log-ins, the number of sessions, a rate of CPU use by a server, or an amount of data transferred to a server.

The unexpected demand model generating part 13 generates the unexpected demand model 52 based on data recorded in the supply data recording part 9. The unexpected demand model 52 is data indicating an unexpected time-based transition that is different from the time-based transition of an amount of the IT resources represented by the demand model 51. The unexpected time-based transition is represented by data indicating a time in the predetermined time period and data indicating an amount of the IT resources required at that time.

In the supply data recording part 9, for example, an IT resource provision log 91 and a management policy 8 are recorded. The IT resource provision log 91 is, for example, log data indicating a track record of providing a portion of the common IT resources 16d to any of the IT resources 16a, 16b and 16c in the IDC 24. Preferably, the management policy 8 is recorded with respect to each of the IT resources 16a, 16b and 16c.

By the input part 14, for example, observation data 26 is inputted from the IT resources 16a, 16b or 16c connected to the unexpected demand detection system 1. The observation data 26 is, for example, data indicating an actual demand observed in the server of the IT resources 16a, 16b or 16c. The observation data 26 contains, for example, the number of Web accesses to a server, the number of log-ins, the number of sessions, a rate of CPU use by a server, or an amount of data transferred to a server. The above-described observation data 26 is contained in, for example, a log generated by a server.

The judging part 2 performs a comparison among the observation data 26 inputted by the input part 14, the demand model 51 recorded in the model recording part 5, and the unexpected demand model 52 thereby to judge whether an unexpected demand represented by the unexpected demand model 52 occurs.

In the case where the judging part 2 judges that an unexpected demand occurs, the addition information generating part 3 generates, based on the unexpected demand model 52, additional IT resource information indicating an amount of an IT resource to be added so as to meet the unexpected demand and a time period in which the IT resource should be added. The additional IT resource information is transmitted to the cost calculating part 4.

Using data recorded in the cost information recording part 7, the cost calculating part 4 calculates a cost for adding the IT resource indicated by the additional IT resource information generated by the addition information generating part 3. In the cost information recording part 7, for example, IT resource price information 71 and management operation information 72 are recorded. The IT resource price information 71 contains, for example, a lease price for the common IT resources 16d. The lease price may be, for example, a fixed price set based on a previous log or a price that varies depending on demand-supply balance. The management operation information 72 contains, for example, data indicating a specific operation cost required for adding an IT resource. In the case of manually adding a server as an IT resource, the management operation information 72 can be, for example, data indicating the number of personnel and a length of time required for the adding operation.

The cost calculated in the cost calculating part 4 is transmitted to the output part 11 along with the additional IT resource information. By the output part 11, the cost calculated by the cost calculating part 4 and the additional IT resource information are outputted by, for example, being displayed by a display apparatus (not shown).

The unexpected demand detection system 1 can be built on, as well as the above-described deployment server 21, a computer such as, for example, a personal computer or a server. A CPU of a computer executes a predetermined program, so that the functions of the judging part 2, the addition information generating part 3, the cost calculating part 4, the output part 11, the unexpected demand model generating part 13, and the input part 14 are implemented. Recording media that can be used in the model recording part 5, the cost information recording part 7 and the supply data recording part 9 include, as well as a recording medium such as a hard disk or a RAM that is built into a computer, a portable recording medium such as a flexible disk or a memory card, and a recording medium in a recording apparatus provided on a network. Further, the model recording part 5, the cost information recording part 7 and the supply data recording part 9 may be formed of a single recording medium or of a plurality of recording media.

The unexpected demand detection system 1 may be formed of the single deployment server 21 as shown in FIG. 1B or of a plurality of servers so as to allow the functions of the unexpected demand detection system 1 to be distributed.

(Operation of the Unexpected Demand Detection System 1)

Figure 3:
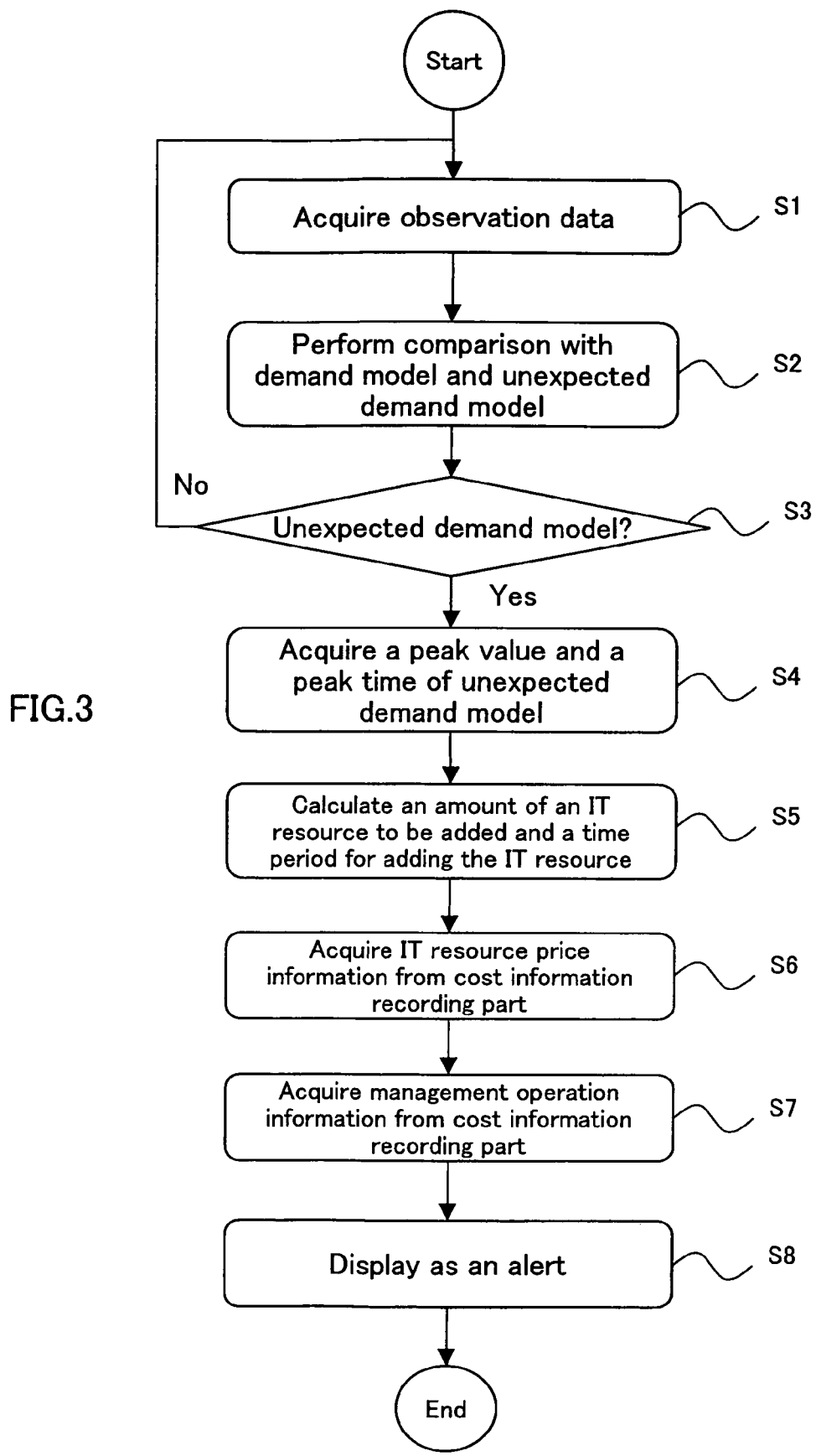
FIG. 3 is a flowchart showing an example of a process in which the unexpected demand detection system 1 detects the occurrence of an unexpected demand based on observation data 26.

The description is directed next to an operation of the unexpected demand detection system 1. FIG. 3 is a flowchart showing an example of a process in which the unexpected demand detection system 1 detects the occurrence of an unexpected demand based on the observation data 26.

First, by the input part 14, the observation data 26 is inputted (Step S1). This embodiment describes as an example a case where from the server of the IT resources 16a of the company A shown in FIG. 1A, data indicating the number of accesses to the server of the IT resources 16a is inputted as the observation data 26. Preferably, for example, the number of accesses to a server obtained at a regular time interval is inputted successively by the input part 14.

The judging part 2 performs a comparison among a transition of the number of accesses indicated by the observation data 26, a transition of the number of accesses represented by the demand model 51 recorded in the model recording part 5, and a transition of the number of accesses represented by the unexpected demand model 52 (Step S2). The following describes examples of the demand model 51, the unexpected demand model 52, and the observation data 26.

FIG. 4A is a graph showing an example of the transition of the number of accesses represented by the demand model 51. In the graph shown in FIG. 4A, horizontal and vertical axes indicate a time and the number of accesses, respectively. Similarly, in each of graphs shown in FIGS. 4B and 4C, horizontal and vertical axes also indicate a time and the number of accesses, respectively. Curves h1 to h4 in the graph shown in FIG. 4A represent transitions of an expected number of accesses to the server of the IT resources 16a in a time period between 6:00 and 24:00, for example. As represented by the curves h1 to h4, a plurality of transitions of the number of accesses can be used as one set of the demand models 51. However, it is not necessarily required that more than one transition of the number of accesses be used as the demand model 51.

FIG. 4B is a graph showing an example of the transition of the number of accesses represented by the unexpected demand model 52. A curve k in the graph represents a transition of the number of accesses in the time period between 6:00 and 24:00, for example, which is a transition of an unexpected number of accesses different from transitions of an expected number of accesses as shown in FIG. 4A. A process of generating the unexpected demand model 52 will be described later.

FIG. 4C is a graph showing an example of the transition of the number of accesses indicated by the observation data 26. A curve g in the graph represents a transition of the number of actual accesses to the server of the IT resources 16a in a time period between 6:00 and 12:00, for example.

The judging part 2 determines whether the transition of the number of accesses indicated by the observation data 26 is more approximate to the transition of the number of accesses represented by the unexpected demand model 52 than to the transitions of the number of accesses represented by the demand models 51 thereby to judge whether an unexpected demand occurs (Step S3).

The judging part 2 calculates, with respect to the time period between 6:00 and 12:00, for example, a minimum squared error between the transition of the number of accesses represented by the curve g in the graph shown in FIG. 4C and each of the transitions of the number of accesses represented by the curves h1 to h2 in the graph shown in FIG. 4A. Moreover, the judging part 2 also calculates a minimum squared error between the curve g shown in FIG. 4C and the curve k shown in FIG. 4B. If a comparison among the calculated minimum squared errors finds that the minimum squared error between the curve g and the curve k is smallest, it is determined that an unexpected demand represented by the unexpected demand model 52 occurs (Yes in Step S3). Although in the above-described method, a minimum squared error is calculated for a comparison among the observation data 26, the demand model 51 and the unexpected demand model 52 by the judging part 2, the comparison process is not limited thereto.

In the case where the judging part 2 determines that an unexpected demand does not occur (No in Step S3), after a lapse of a certain length of time, a succeeding piece of data is newly inputted as the observation data 26 (Step S1). After that, the processes of Steps S2 and S3 are repeated.

In the case where the judging part 2 judges that an unexpected demand has occurred (Yes in Step S3), the addition information generating part 3 acquires a peak value and a peak time of the number of accesses from the unexpected demand model 52 (Step S4). For example, an access number Ap and a time tp are acquired that intersect each other at a peak point p on the curve k in FIG. 4B. Based on these values, the addition information generating part 3 generates additional IT resource information indicating, for example, a type and an amount of an IT resource to be added and a time period for adding the IT resource (Step S5). For example, a type and an amount of an IT resource to be added can be selected so as to allow the access number Ap at the peak time to be handled. For example, one server, a HDD capacity of 100 GB, and a rate of CPU use of 50% are employed as a type and an amount of an IT resource. A time period for adding an IT resource can be determined to be, for example, two hours before and after the peak time tp.

The cost calculating part 4 acquires the IT resource price information 71 from the cost information recording part 7 (Step S6). The cost calculating part 4 calculates a price of an IT resource to be added using the IT resource price information 71. For example, in the case where an amount of an IT resource indicated by the additional IT resource information corresponds to one server, a rental fee per hour for one server is acquired as the IT resource price information 71.

The cost calculating part 4 acquires the management operation information 72 from the cost information recording part 7 (Step S7). For example, in the case where an amount of an IT resource indicated by the additional IT resource information corresponds to one server, the cost calculating part 4 acquires a fee and a length of time required for an operation of adding one server to the IT resources 16a.

The IT resource price information 71 and the management operation information 72 that are recorded in the cost information recording part 7 are not limited to the above-described examples.

By the output part 11, the additional IT resource information generated in Step S5, the IT resource price information 71 acquired in Step S6, and the management operation information 72 acquired in Step S7 are displayed on, for example, a display of a terminal of the company A (not shown) (Step S8). Thus, before a peak of the number of accesses is reached, the company A can be notified of the possibility that unexpected accesses occur in the IT resources 16a. That is, in utility management of the IT resources 16a, detecting an unexpected demand in advance allows the company A to take preventive measures.

Furthermore, it is possible to indicate when and how much of an IT resource is required in order to handle unexpected accesses. Moreover, it is possible to indicate a cost required for handling unexpected accesses. By the output part 11, an access number at a peak time and a time when a peak of the number of accesses is reached may be displayed. A manager A, after viewing the display, can obtain an idea of an IT resource to be added.

Although in FIG. 4, the demand models 51 and the unexpected demand model 52 represent the transitions in the time period between 6:00 and 24:00, a time period for a transition is not limited thereto. For example, a time period for the transitions represented by the demand model 51 and the unexpected demand model 52 also can be set to one week, one month, one year or the like so that an unexpected demand occurring in that time period is detected.

(Example 1 of a Process of Generating the Unexpected Demand Model 52)

Figure 5:
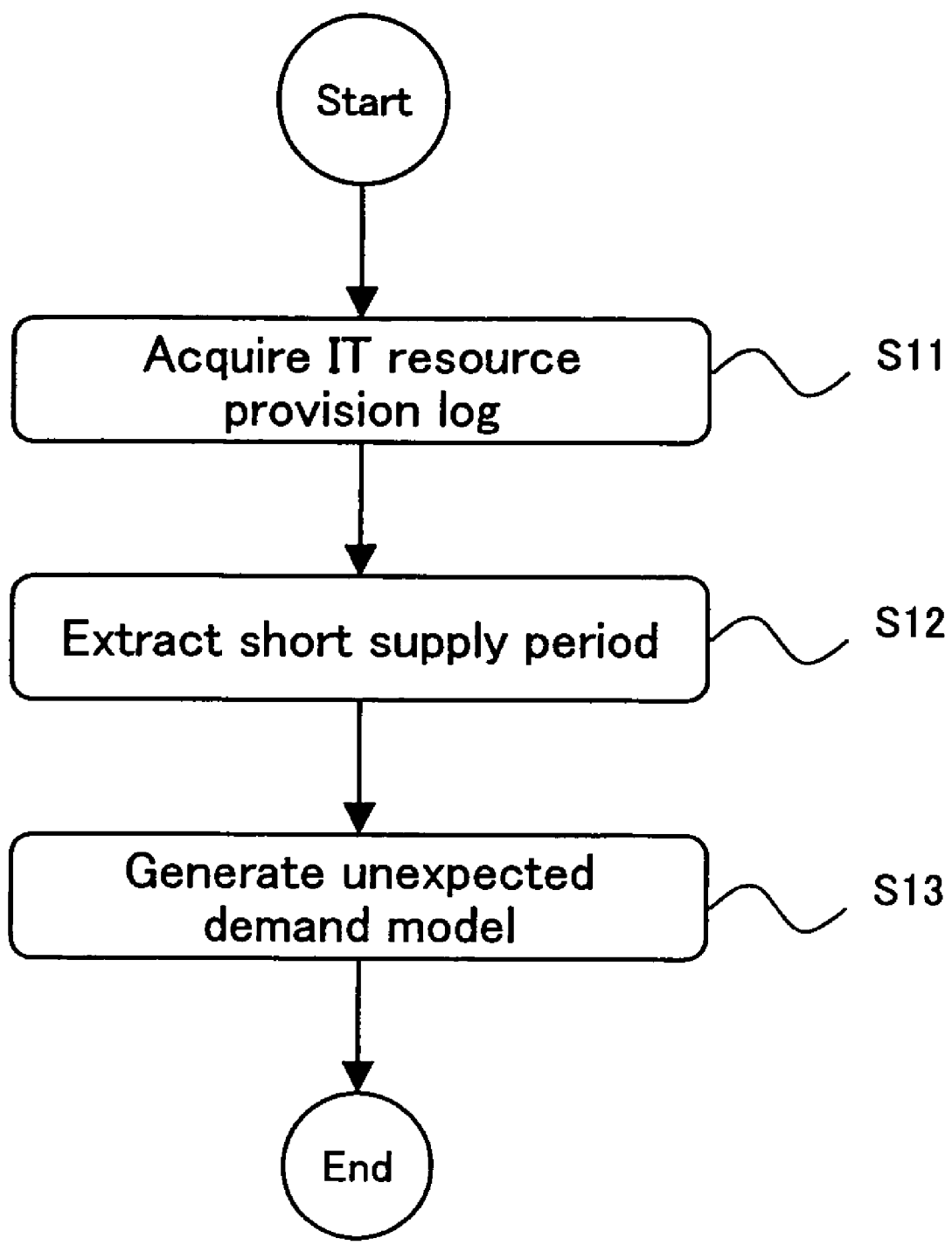
FIG. 5 is a flowchart showing an example of a process in which an unexpected demand model generating part 13 generates an unexpected demand model 52.

The description is directed to an example of a process of generating the unexpected demand model 52. FIG. 5 is a flowchart showing an example of a process in which the unexpected demand model generating part 13 generates the unexpected demand model 52. First, the unexpected demand model generating part 13 acquires the IT resource provision log 91 from the supply data recording part 9 (Step S11). The IT resource provision log 91 contains, for example, data indicating a time period in which a portion of the common IT resources 16d was provided to any of the business systems in the IDC 24 and an amount of the provided portion of the common IT resources 16d.

The unexpected demand model generating part 13 extracts, from the IT resource provision log 91, a time period in which an available portion of the common IT resources 16d becomes scarce (Step S12). In the unexpected demand model generating part 13, a time period in which the common IT resources 16d are provided in a larger amount than usual and thus become scarce can be extracted as a short supply period. For example, suppose that with respect to a time period between 6:00 and 24:00, an hourly mean value of an amount of a provided portion of the common IT resources 16d is determined based on data of the IT resource provision log 91, and it is found that in a time period between 20:00 and 22:00, not more than 20% of the common IT resources 16d remains to be provided. In this case, the time period between 20:00 and 22:00 is extracted as the short supply period.

The unexpected demand model generating part 13 generates the unexpected demand model 52 representing a transition of the number of accesses whose peak is reached in the short supply period extracted in Step S12 (Step S13). For example, data indicating a transition of the number of accesses whose peak is reached at 21:00 that is included in the time period between 20:00 and 22:00 used in the above-described example is generated as the unexpected demand model 52.

When time-series data such that a peak is reached in a time period in which an available portion of the IT resources becomes scarce is generated as the unexpected demand model 52, the judging part 2 can judge whether an unexpected demand occurs that peaks in a time period in which an available supply amount of the IT resources is insufficient and thus is highly risky. As a result, the companies A, B and C that operate the business systems using the IT resources 16a, 16b and 16c, respectively, can detect an unexpected demand while estimating a risk, which facilitates the determination of a need to take preemptive measures.

(Example 2 of the Process of Generating the Unexpected Demand Model 52)

Figure 6:
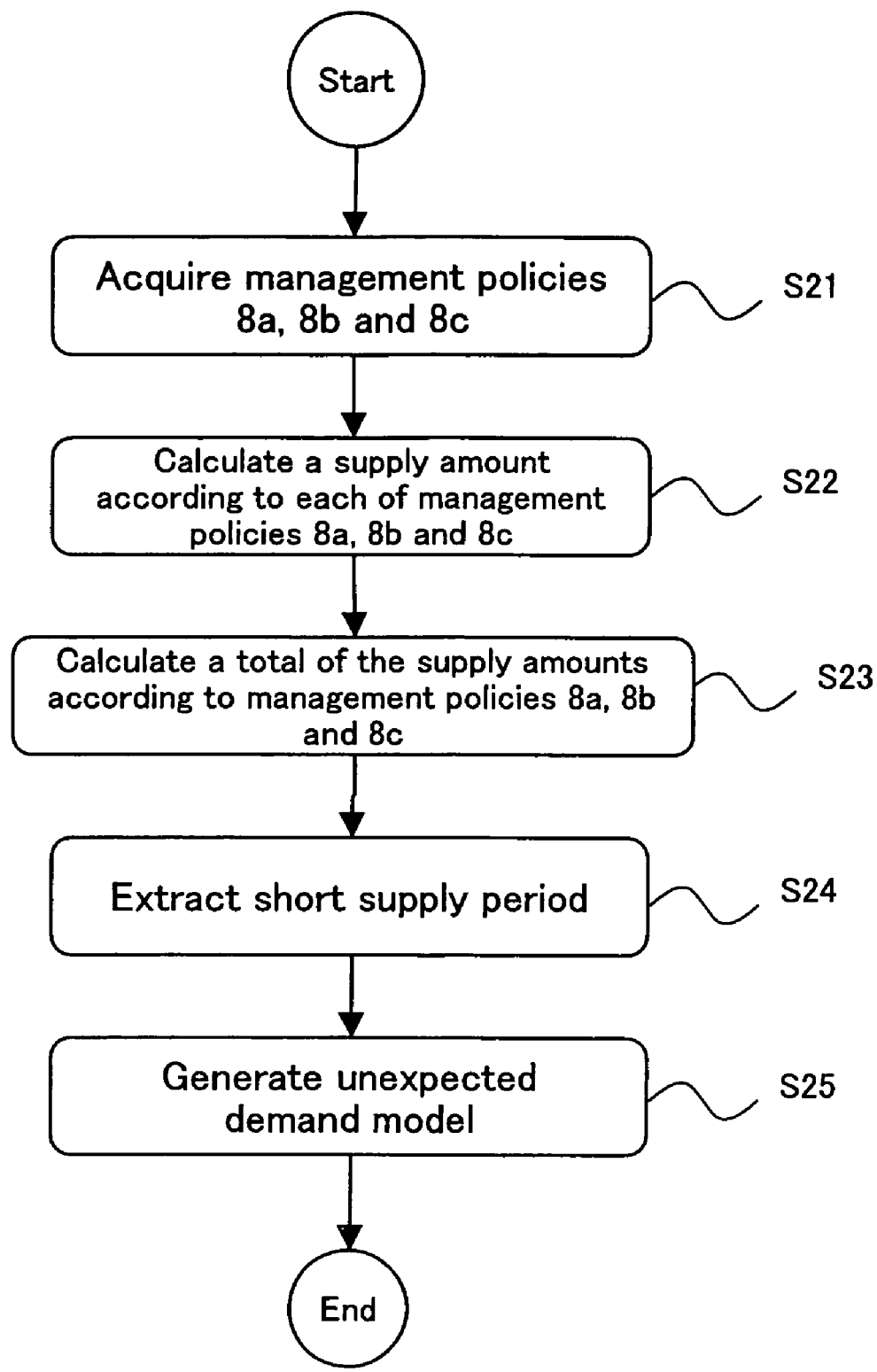
FIG. 6 is a flowchart showing an example of the process in which the unexpected demand model generating part 13 generates the unexpected demand model 52.

The description is directed to another example of the process of generating the unexpected demand model 52. FIG. 6 is a flowchart showing an example of the process in which the unexpected demand model generating part 13 generates the unexpected demand model 52. First, the unexpected demand model generating part 13 acquires the management policy 8 from the supply data recording part 9 (Step S21). The management policy 8 contains, for example, the management policy 8a of the company A, the management policy 8b of the company B, and the management policy 8c of the company C.

The unexpected demand model generating part 13 performs a simulation with respect to each of the acquired management policies 8a, 8b and 8c thereby to determine a time-based transition in a predetermined time period of an amount of a portion of the common IT resources that is to be added to each of the business systems of the companies A, B and C (Step S22). The management policy contains data indicating a time period for adding an IT resource to a business system and an amount of the IT resource to be added, and thus the above-described time-based transition can be determined based on the data.

Figure 7A:
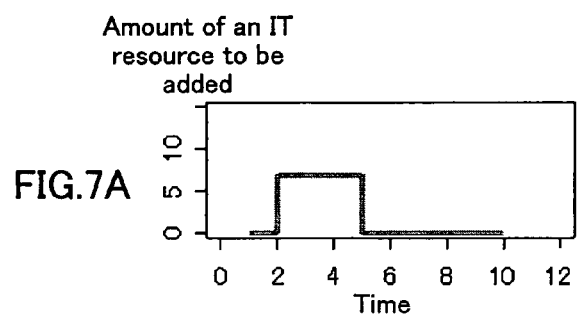
FIG. 7A is a graph showing an example of a time-based transition of an amount of an IT resource to be added according to a management policy 8a, FIG. 7B is a graph showing an example of a time-based transition of an amount of an IT resource to be added according to a management policy 8b.
Figure 7B:
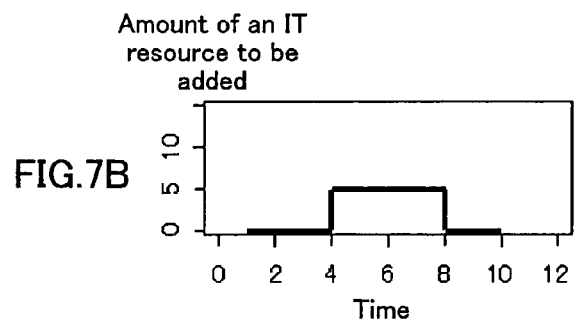
FIG. 7C is a graph showing an example of a time-based transition of an amount of an IT resource to be added according to a management policy 8c.
FIG. 7D is a graph showing a time-based transition of a total of the amounts of the IT resources to be added shown in the graphs of FIGS. 7A, 7B and 7C.
Figure 7C:
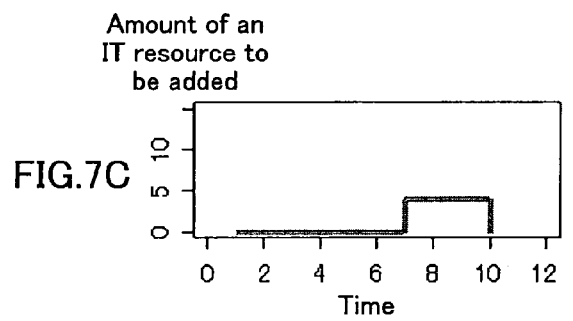

FIG. 7A is a graph showing an example of a time-based transition of an amount of an IT resource to be added according to the management policy 8a, FIG. 7B is a graph showing an example of a time-based transition of an amount of an IT resource to be added according to the management policy 8b, and FIG. 7C is a graph showing an example of a time-based transition of an amount of an IT resource to be added according to the management policy 8c. In each of the graphs shown in FIGS. 7A, 7B and 7C, vertical and horizontal axes indicate an amount of an IT resource to be added and a time, respectively.

Figure 7D:
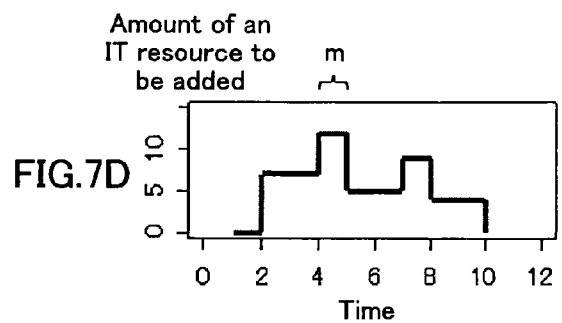

The unexpected demand model generating part 13 determines a time-based transition of a total amount of portions of the common IT resources that are to be added to the business systems of the companies A, B and C, respectively (Step S23). FIG. 7D is a graph showing a time-based transition of a total of the amounts of the IT resources to be added shown in the graphs of FIGS. 7A, 7B and 7C.

The unexpected demand model generating part 13 extracts a time period in which a total amount of the portions of the common IT resources to be added to the business systems of the companies A, B and C surpasses an amount of an available portion of the common IT resources (Step S24). The time period is extracted as a short supply period. For example, in the graph shown in FIG. 7D, a time period in which a total amount of the IT resources to be added exceeds 10, namely, a time period m in the graph is extracted as the short supply period.

The unexpected demand model generating part 13 generates the unexpected demand model 52 representing a transition of the number of accesses whose peak is reached in the short supply period extracted in Step S24 (Step S25). For example, data indicating a transition of the number of accesses whose peak is reached in the time period m shown in the graph in FIG. 7D is generated as the unexpected demand model 52.

Embodiment 2

Figure 8:
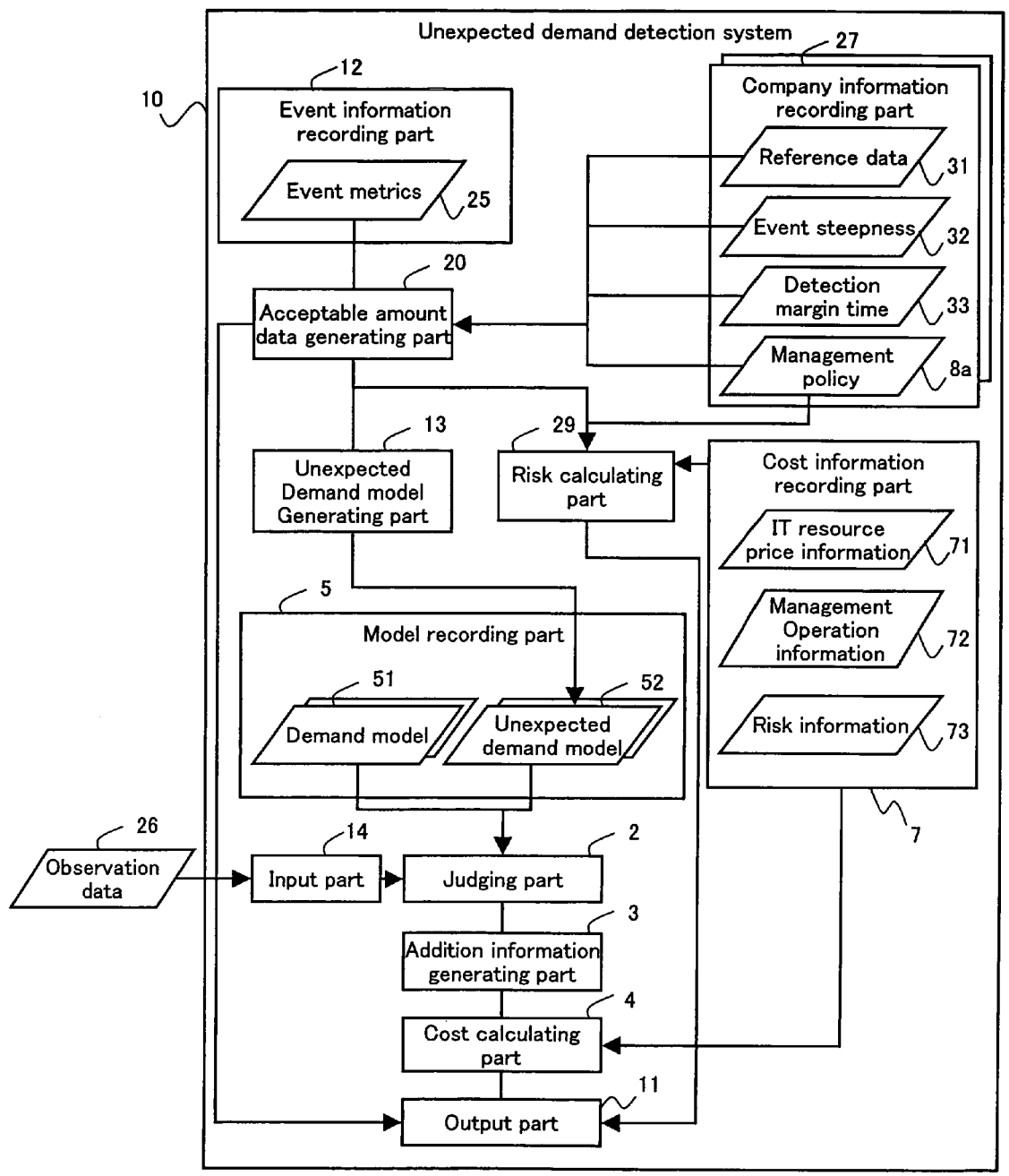
FIG. 8 is a functional block diagram showing a structure of an unexpected demand detection system according to Embodiment 2.

FIG. 8 is a functional block diagram showing a structure of an unexpected demand detection system according to Embodiment 2. In the structure shown in FIG. 8, the same reference numerals are used as in FIG. 2 for the same components, and duplicate descriptions thereof are omitted. An unexpected demand detection system 10 shown in FIG. 8 includes an acceptable amount data generating part 20, a risk calculating part 29, an event information recording part 12, and a company information recording part 27. In a cost information recording part 7, risk information 73 is recorded.

In the event information recording part 12, event metrics 25 are recorded. The event metrics 25 will be described later. In the company information recording part 27, reference value data 31, event steepness 32, a detection margin time 33, and a management policy 8 are recorded.

Preferably, by the company information recording part 27, information regarding the companies A, B and C that are management entities managing the business systems using the IT resources in the IDC 24 is recorded with respect to each of the companies A, B and C. Accordingly, the reference value data 31, the event steepness 32, the detection margin time 33, and the management policy 8 are recorded with respect to each of the companies A, B and C. As an example, this embodiment describes data regarding the company A.

For example, a management policy 8a of the company A contains data indicating an amount of an IT resource to be added to the business system of the company A when an increase in demand for the IT resources 16a due to the occurrence of an event is detected in a predetermined time period. Further, the management policy 8a also contains data indicating a preparation time that is a length of time required from the detection of the increase in demand for the IT resources 16a due to the occurrence of the event to the addition of the IT resource.

The reference value data 31 is data indicating a time-based transition in a predetermined time period of a reference value for judging the presence or absence of an increase in demand for the IT resources due to the occurrence of an event. For example, as the reference value data 31, data can be used that indicates a time-based transition in a predetermined time period of a variation width of the number of accesses to a Web site in the server included in the IT resources 16a of the company A. The time-based transition is represented by, for example, data indicating a time in the predetermined time period and data indicating a variation width of the number of accesses in the IT resources at that time.

Figures 9, 10:
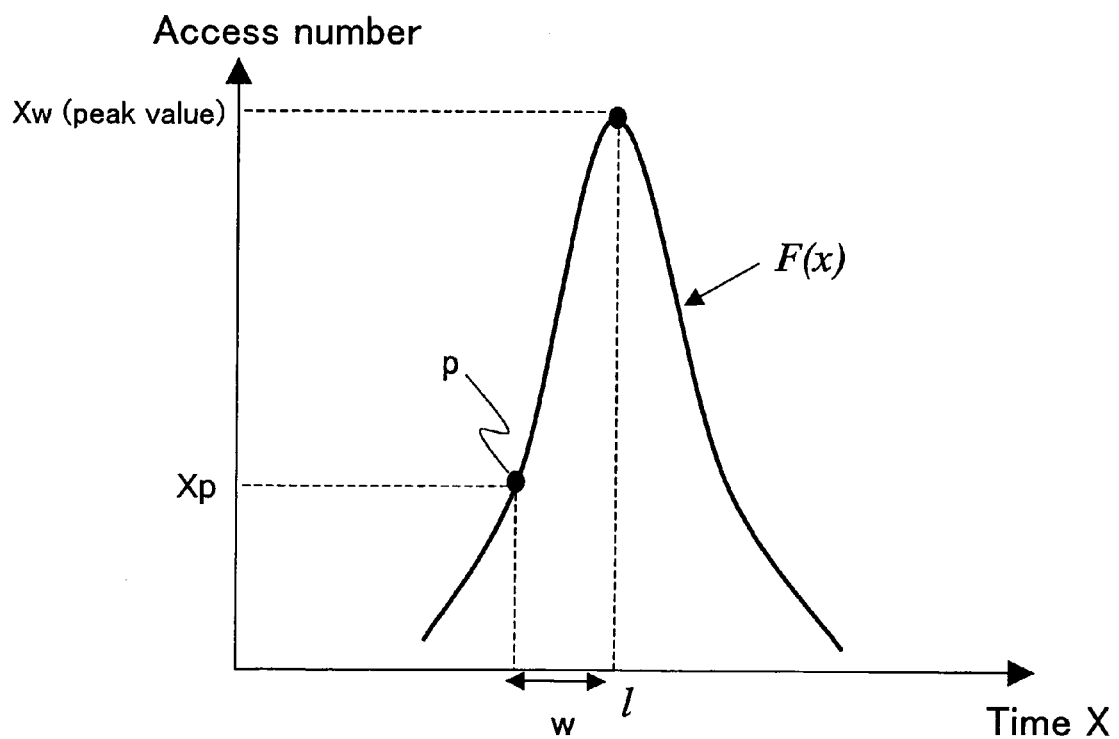
FIG. 9 is a diagram showing an example of a data structure of reference value data 31.
FIG. 10 is a graph showing an example of the number of accesses that varies due to the occurrence of an event.

FIG. 9 is a diagram showing an example of a data structure of the reference value data 31. In the example shown in FIG. 9, with respect to a predetermined time period between 6:00 and 24:00, values of a standard deviation indicating a variation width of an hourly number of accesses are recorded. For example, an access number at 10:00 varies daily. For example, a standard deviation of access numbers at 10:00 in the past 10 days is defined as a variation width of the access number at 10:00. The variation width can be represented by, as well as a standard deviation, a value indicating a degree of dispersion such as, for example, a range, a mean deviation, a variance, a sum of squares, or a coefficient of variation. The standard deviation of the number of accesses shown in FIG. 9 can be determined based on, for example, log data in which previously obtained numbers of accesses are recorded.

For example, in the case where, at a certain time in the predetermined time period, the number of accesses exceeds a variation width at that time indicated by the reference value data, it can be determined that there is an increase in demand due to the occurrence of an event, namely, an increase in number of accesses. Further, a time when the number of accesses exceeds a variation width indicated by the reference value data, may be determined to be a starting time of the occurrence of an event. Similarly, in the case where, at a time in the predetermined time period, the number of accesses falls below a variation width at that time indicated by the reference value data, it can be determined that there is no longer an increase in number of accesses due to the occurrence of an event. A time when the number of accesses falls below a variation width indicated by the reference value data, may be determined to be an ending time of an event.

The data structure of the reference value data 31 is not limited to the structure shown in FIG. 9. Although values of the standard deviation are recorded hourly in the example shown in FIG. 9, there is no limitation thereto, and values also may be recorded every 10 minutes or every two hours, for example. Further, the predetermined time period is not limited to the time period between 6:00 and 24:00 employed in the example shown in FIG. 9, either. As the predetermined time period, for example, a time period between 0:00 and 24:00, a time period of one week, one month or one year also may be employed.

The event steepness 32 is, for example, data indicating a speed at which the number of accesses varies due to the occurrence of an event such as a campaign run by the company A. The event steepness 32 can be represented by, for example, a slope of a graph showing a variation in number of accesses due to the occurrence of an event or an acceleration of a variation in number of accesses. Further, as in an example shown below, it also is possible to model steepness s using a function that is a modification of a logistic density function.

FIG. 10 is an example of a graph showing the number of accesses that varies due to the occurrence of an event. In the graph shown in FIG. 10, vertical and horizontal axes indicate the number of accesses and a time x, respectively. A transition of the number of accesses is represented by a curve of F(x). A point p indicates an access number Xp at a time when an increase in number of accesses due to an event is detected. Xw indicates a peak value of the number of accesses, and w indicates a length of time from the time when an increase in the number of accesses due to an event is detected to the time when a peak of the number of accesses is reached. Further, l indicates a time when a peak of the number of accesses is reached. For example, F(x) is a modification of the logistic density function expressed by Mathematical Expression 1 below.

(Mathematical Expression 1)

$$F(x) = \frac{e^{-\frac{x-1}{s}}}{\left(1 - e^{-\frac{x-1}{s}}\right)^2}$$

In Mathematical Expression 1 above, s represents steepness. The logistic density function is a function expressed by Mathematical Expression 2 below.

(Mathematical Expression 2)

$$F(x) = \frac{e^{-\frac{x-1}{s}}}{s\left(1 - e^{-\frac{x-1}{s}}\right)^2}$$

The logistic density function expressed by Mathematical Expression 2 above is a function such that an integral value from minus infinity to plus infinity is 1. In the logistic function, if s is set to be smaller, that is, if a curve represented by the logistic function is set to have a steeply sloping peak, the peak has an increased height so that an area is kept at 1. Conversely, if s is set to be greater, that is, if the curve represented by the logistic function is set to have a gently sloping peak, the peak has a decreased height so that the area is kept at 1. Mathematical Expression 1 above is a function obtained by multiplying the denominator in the logistic density function expressed by Mathematical Expression 2 by s so that a peak has a constant height even when the value of s varies. By modifying the logistic density function to Mathematical Expression 1 above, a function more adaptable to a variation in number of accesses due to an event can be obtained.

As described above, the steepness s can be modeled using a function that is a modification of the logistic function, such as expressed by Mathematical Expression 1 above. The steepness is not limited to s expressed in Mathematical Expression 1 above.

The steepness s can be said to be a value characterizing the shape of a graph representing a variation in number of accesses due to an event. That is, the steepness s is data in the form of a numerical value indicating how an event attributable demand varies. For example, the curve expressed by the function F(x) shown in FIG. 10 has a shape that is determined by the steepness s. Therefore, when the steepness s varies, where the time w is constant, a value of Xw/Xp varies. Further, when the steepness s is constant, the value of Xw/Xp varies depending on the time w. A relationship among the steepness s, the time w and the value of Xw/Xp is recorded with respect to each of a plurality of values of s and a plurality of values of w, forming data as an example of the event metrics 25.

Event metrics are indices, each indicating a relationship among the number of accesses at a time when an event is detected, the number of accesses at a peak time, steepness, and a length of time from the time of the detection to the time when a peak of the number of accesses is reached.

The acceptable amount data generating part 20 shown in FIG. 8 generates acceptable amount data based on the event metrics 25, the reference value data 31, the event steepness 32, the detection margin time 33, and the management policy 8a. The acceptable amount data will be described later. The acceptable amount data is displayed by the output part 11.

Based on the acceptable amount data generated by the acceptable amount data generating part 20, the management policy 8 recorded in the company information recording part 27, and information recorded in the cost information recording part 7, the risk calculating part 29 calculates the magnitude of a risk in the business system managed according to the management policy 8. The calculated magnitude of the risk is displayed by the output part 11.

An unexpected demand model generating part 13 generates an unexpected demand model 52 based on the acceptable amount data generated in the acceptable amount data generating part 20 and records the unexpected demand model 52 in a model recording part 5.

(Process of Generating Acceptable Amount Data)

Figure 11:
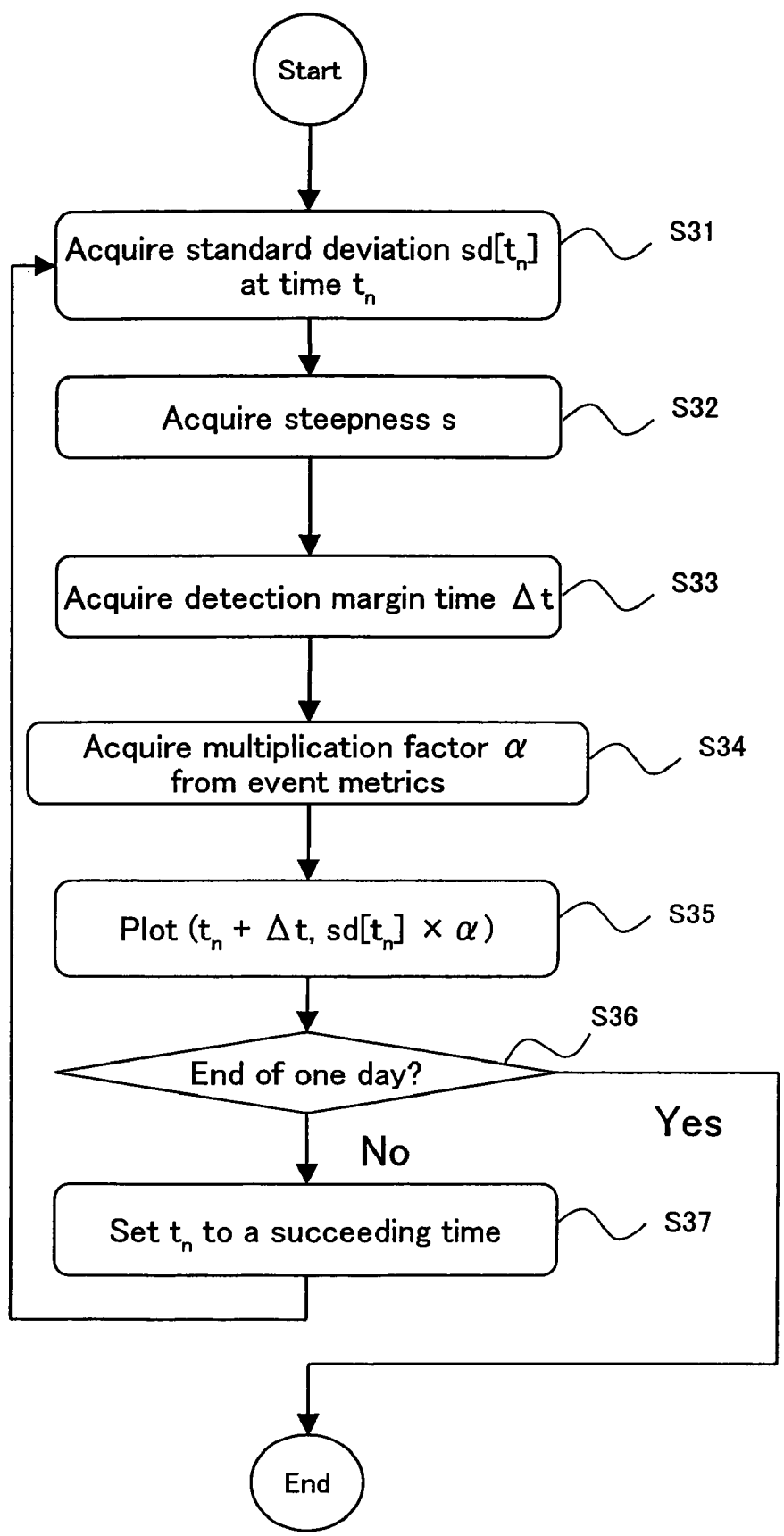
FIG. 11 is a flowchart showing an example of a process in which an acceptable amount data generating part 20 calculates an acceptable amount.

The description is directed next to a process in which the acceptable amount data generating part 20 generates acceptable amount data. FIG. 11 is a flowchart showing an example of a process in which the acceptable amount data generating part 20 calculates an acceptable amount. First, the acceptable amount data generating part 20 acquires a standard deviation sd $[t_n]$ at a time $t_n$ from the reference value data 31 recorded in the company information recording part 27 (Step S31). The reference value data 31 has the data structure shown in FIG. 9, for example. Where the time $t_n$=6:00, the acceptable amount data generating part 20 acquires a value sd [6:00]=900 as a standard deviation at 6:00 from the reference value data 31 shown in FIG. 9.

Next, the acceptable amount generating part 20 acquires steepness s recorded in the event steepness 32 (Step S32). Moreover, the acceptable amount data generating part 20 also acquires, as the detection margin time 33, a detection margin time Δt for a subject to be analyzed recorded in the company information recording part 27 (Step S33).

Based on the steepness s acquired in Step S32 and the detection margin time Δt acquired in Step S33, the acceptable amount data generating part 20 acquires a multiplication factor α from the event metrics 25 (Step S34). The event metrics 25 are, for example, when referring to the graph shown in FIG. 10, data indicating a relationship among the access number Xw at a time when a peak of the number of accesses that increases due to the occurrence of an event is reached, the access number Xp at a time when an increase in the number of accesses due to the event is detected, the steepness s of the increase in the number of accesses, and the detection margin time w that is a length of time from the time when the increase in demand due to the event is detected to the time when a peak of the demand is reached.

Figure 12:
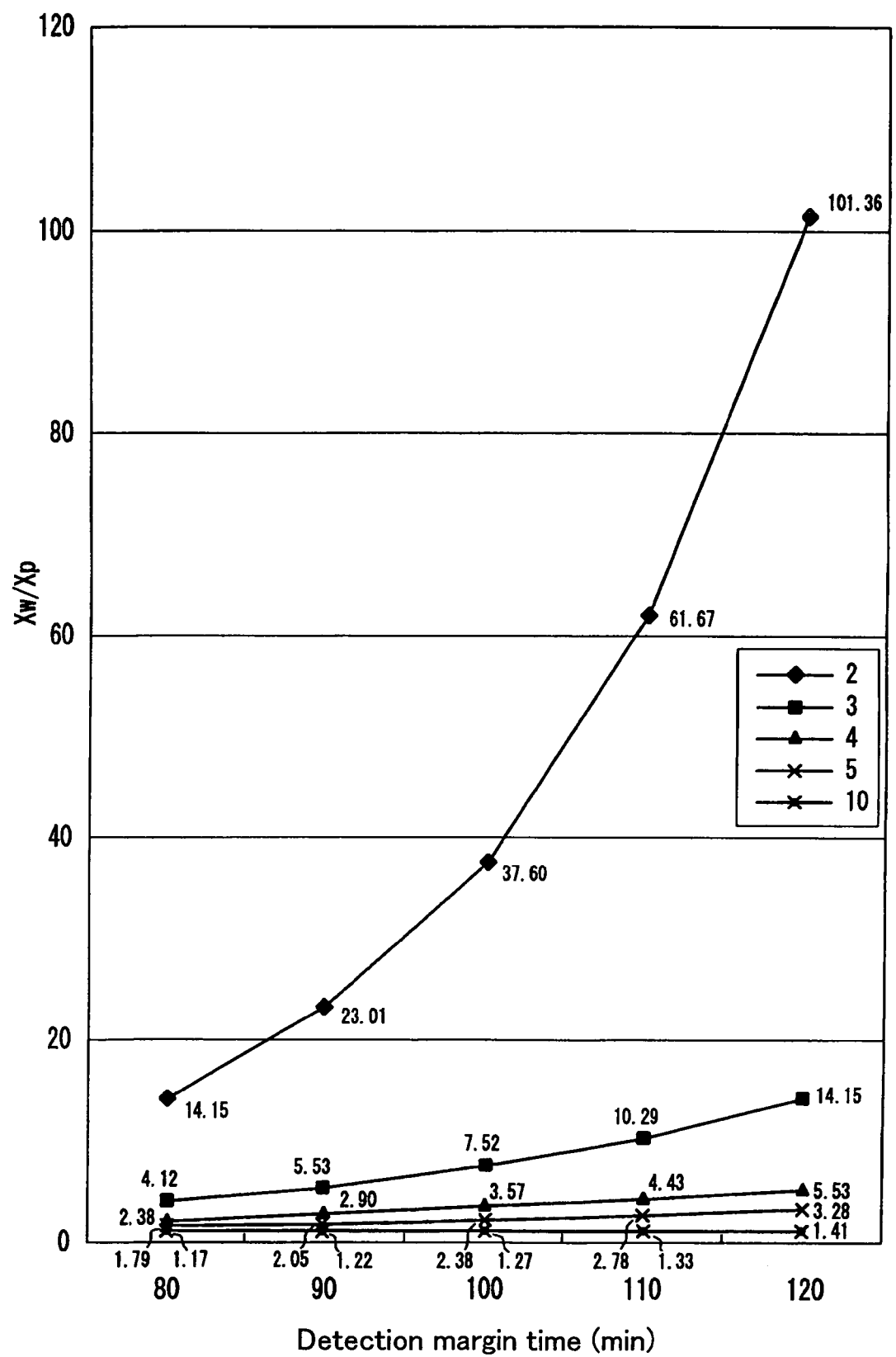
FIG. 12 is a graph showing a relationship among values Xw, Xp, s and w.

The relationship among these values Xw, Xp, s, and w is, for example, a relationship represented by the graph shown in FIG. 12. In the graph shown in FIG. 12, vertical and horizontal axes indicate (Xw/Xp) and the detection margin time w, respectively. Five kinked lines in the graph represent variations of (Xw/Xp) with respect to w in the cases of steepness values of 2, 3, 4, 5, and 10, respectively. In the case where a time when the number of accesses exceeds a standard deviation is defined as a time when the increase in demand due to an event is detected, the access number Xp at a time when an increase in the number of accesses due to an event is detected equals a standard deviation at that time of the detection. Therefore, a standard deviation can be substituted for Xp.

FIG. 13 is a diagram showing an example of a data structure of the event metrics 25. Data shown in FIG. 13 is data indicating the relationship among the values Xw, Xp, s, and w represented by the graph in FIG. 12. For example, where s=3 and Δt=90, the acceptable amount data generating part 20 acquires a value 5.533831 as a corresponding value of the multiplication factor α from the event metrics 25 shown in FIG. 13.

The data indicating the relationship among the values Xw, Xp, s, and w is not limited to the data structure of the event metrics 25 shown in FIG. 13. For example, the value Xw/Xp may be obtained by a function programmed to return the value Xw/Xp when s and w are passed thereto as arguments.

The acceptable amount data generating part 20 plots, as an acceptable number of accesses at a time after a lapse of Δt from the time $t_n$, a value obtained by multiplying the standard deviation sd $[t_n]$ by the multiplication factor α (Step S35). If the time $t_n$ is not 24:00 at which one day ends (No in Step S36), the acceptable amount data generating part 20 sets the time $t_n$ to a succeeding time (for example, a time one hour ahead) (Step S37) and repeats the processes of Steps S31 to S35. Thus, for example, where $t_n$=6:00 as an initial value, in a time period between 6:00 and 24:00, an hourly acceptable number of accesses can be obtained. That is, it is possible to obtain acceptable amount data indicating a time-based transition of the acceptable number of accesses.

Figure 14:
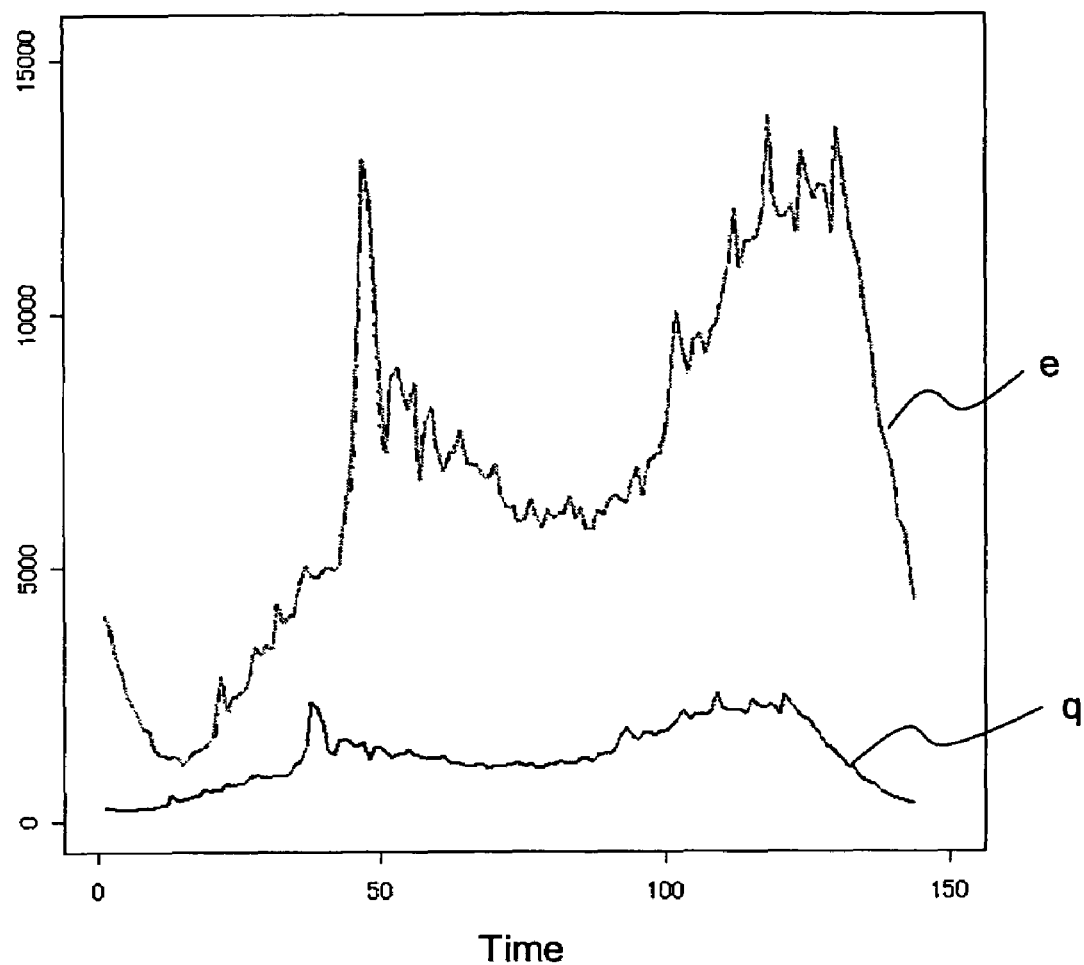
FIG. 14 is a graph showing an example of a time-based transition of an acceptable number of accesses indicated by acceptable amount data generated by the acceptable amount data generating part 20.

FIG. 14 is a graph showing an example of a time-based transition of the acceptable number of accesses indicated by the acceptable amount data generated by the acceptable amount data generating part 20. In FIG. 14, vertical and horizontal axes indicate the number of accesses and a time, respectively. In the graph shown in FIG. 14, a line q represents a time-based transition of a standard deviation of the number of accesses, and a line e represents a time-based transition of the acceptable number of accesses. The line e shows an example of the number of accesses calculated assuming that the steepness s=3 and the detection margin time Δt=90 (min). As indicated by the example, in the case where a length of time from the time when an increase in number of accesses due to an event is detected to the time when the increase is handled is 90 minutes, even if the number of accesses peaks with an access number lower than an access number represented by the line e, the number of accesses has peaked out when the increase is handled, resulting in a failure in handling the increase. For example, suppose that an increase in number of accesses due to an event is detected, and after a lapse of 90 minutes from the time of the detection, the increase is handled by the addition of a server or the like. In this case, if the increase in the number of accesses peaks with an access number lower than an access number represented by the line e and peaks out early, it follows that the handling of the increase by the addition of a server or the like has failed.

Figure 15:
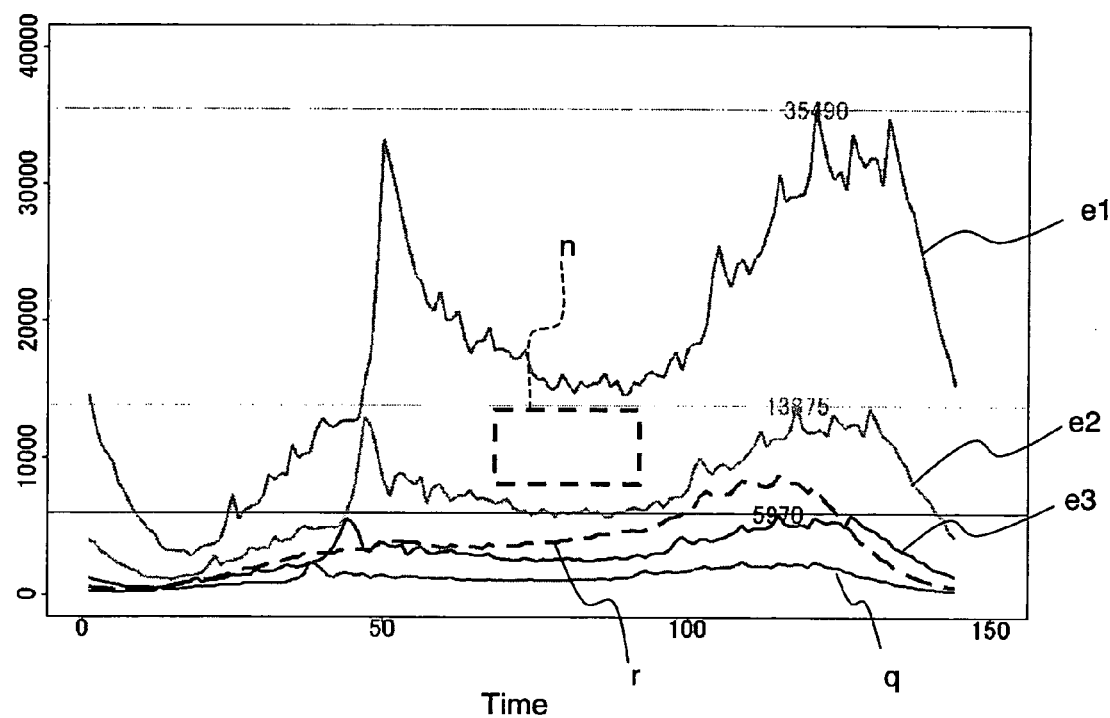
FIG. 15 is a graph showing an example of a transition of the acceptable number of accesses indicated by the acceptable amount data.

The example shown in FIG. 14 only shows the number of accesses calculated assuming that the detection margin time Δt=90 (min). However, for example, it also is possible to calculate an acceptable number of accesses with respect to a plurality of values of the detection margin time Δt. FIG. 15 is a graph showing an example of a transition of an acceptable number of accesses indicated by the acceptable amount data, in which the acceptable number of accesses is calculated with respect to Δt=60, Δt=90, and Δt=120, respectively.

In FIG. 15, horizontal and vertical axes indicate the number of accesses and a time, respectively. In the graph shown in FIG. 15, a line q represents a time-based transition of a standard deviation of the number of accesses. Lines e1, e2, and e3 represent time-based transitions of the acceptable number of accesses in the cases of Δt=120, Δt=90, and Δt=60, respectively. In each of the cases represented by the lines e1, e2, and e3, it is assumed that the steepness s=3. A line r represents a transition of a mean number of accesses. The larger the value of the detection margin time Δt, the larger the acceptable number of accesses is. This indicates that the detection margin time Δt should be set to be large only in the case of a large-scale event. Further, the larger the value of Δt, the higher a peak that is reached at a time in the neighborhood of a time t=50. Since a variation in number of accesses due to an event (event variation) is detected at a point in time at which the number of accesses exceeds a standard deviation, the detection of the event variation is delayed when the standard deviation has a large value. Hence, difficulty is found in detecting a variation at a time immediately after t=50 when the standard deviation has a large value.

Understandably, for example, in the case where an event variation occurs that has a peak falling in a region n shown by a dotted line in FIG. 15, the event variation can be handled when the detection margin time is 90 minutes or less. This is because the region n lies above the line e2. However, the event variation could not be handled when the detection margin time is 120 minutes or more. This is because the region n lines below the line e1. When the preparation time that is a length of time required for adding an IT resource is set to be 120 minutes in the management policy 8a of the company A, there is a possibility that an event variation whose peak falls in the region n could not be handled. In this case, preferably, the company A improves the capabilities by changing the contents of the management policy 8a for utility management so as to reduce the preparation time, or revises an even plan. It is expected that a reduction in the preparation time will result in a cost increase.

(Modification Example of the Process of Generating Acceptable Amount Data)

In the above-described example of the process of generating acceptable amount data, acceptable amount data is calculated assuming that the steepness s has a fixed value. However, the steepness s also may be set to have a value that varies with time. For example, the steepness s acquired in Step S32 in the flowchart shown in FIG. 11 also may be a value that varies with time. FIG. 16 illustrates graphs showing an example of the steepness s that varies with time, a time-based transition of a standard deviation, and a transition of an acceptable number of accesses. In the graph shown in a lower portion of FIG. 16, a curve s(t) represents the steepness s that varies with time. In the graph shown in an upper portion of FIG. 16, a curve q1 represents a time-based transition of a standard deviation indicated by the reference value data 31. A line e4 represents a transition of the number of accesses that can be handled after a lapse of 90 minutes, which is calculated in the acceptable amount data generating part 20 based on the steepness represented by the curve s(t) and the standard deviation represented by the curve q1.

The curve s(t) represents, for example, an hourly mean value of the steepness in event variations that have occurred previously in the IT resources 16a of the company A. For example, it is shown that a mean value of the steepness at 11:00 in the past 100 days is S1.

(Example of a Risk Calculating Process Using Acceptable Amount Data)

Figure 17:
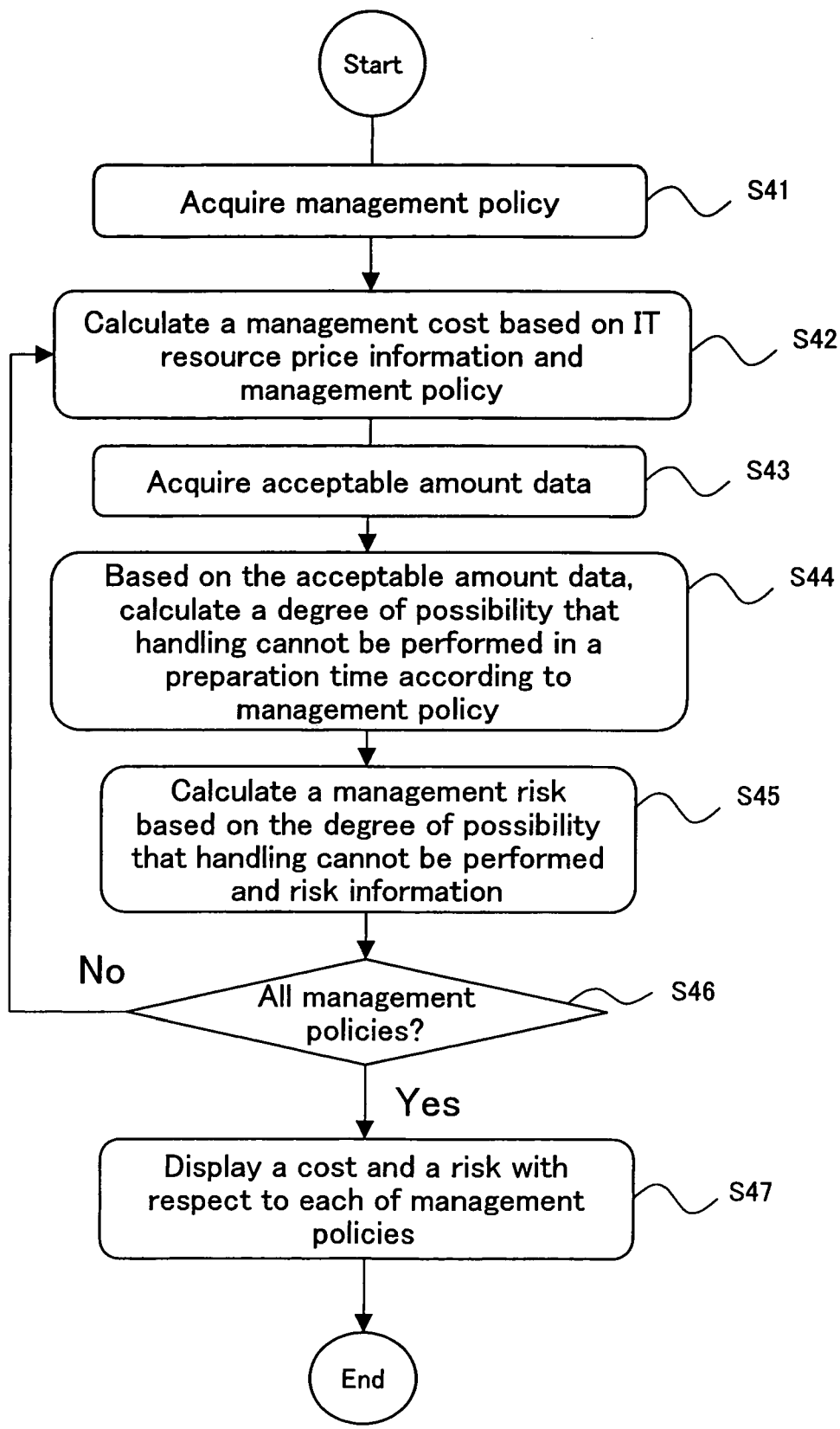
FIG. 17 is a flowchart showing an example of a process in which a risk calculating part 29 calculates, for example, the magnitude of a risk in a business system managed according to a management policy 8A of a company A.

The description is directed next to an example of a process in which, using the acceptable amount data generated by the acceptable amount data generating part 20, the risk calculating part 20 calculates the magnitude of a risk in the business system managed according to the management policy 8. FIG. 17 is a flowchart showing an example of a process in which the risk calculating part 29 calculates, for example, the magnitude of a risk in the business system managed according to the management policy 8A of the company A.

The risk calculating part 29 acquires the management policy 8a of the company A from the company information recording part 27 (Step S41). The management policy 8*a* of the company A contains data indicating an amount of an IT resource to be added to the business system of the company A in the case where an increase in demand for the IT resources 16*a* due to the occurrence of an event is detected in a predetermined time period. Further, the management policy 8*a* also contains data indicating the preparation time that is a length of time required from the detection of the increase in demand for the IT resources 16*a* due to the occurrence of the event to the addition of the IT resource.

Using these pieces of data and IT resource price information 71 that is recorded in the cost information recording part 7, the risk calculating part 29 calculates a cost required for adding an IT resource according to the management policy 8*a* (Step S42).

A cost for adding an IT resource includes, for example, a cost that is added depending on an amount of an IT resource to be added and a cost that is added depending on the capabilities of an IT resource. The capabilities of an IT resource include, for example, a capability that shows how much the IT resource can reduce the preparation time. That is, the more the preparation time is reduced, the higher the cost becomes. Further, for example, the cost varies between the case of on-demand management in which it is ensured that an IT resource is added when an increase in demand for IT resources is detected and the case of best-effort management in which if there is an excess in the IT resources 16*d* that can be used commonly on the IDC 24 side, the excess is added.

In order to cope with this, in the IT resource price information 71, for example, a function O(t) representing a coefficient that varies with preparation time in the case of the on-demand management and a function B(t) representing a coefficient that varies with preparation time in the case of the best-effort management are recorded. Further, in the IT resource price information 71, a coefficient S for calculating a cost that varies according to an amount of an IT resource to be added also is recorded. An amount of an IT resource is represented by, for example, the number of accesses, the number of sessions, a rate of CPU use, a hard disk capacity, or the number of servers.

Using O(t), B(t) and S described above, the risk calculating part 29 can calculate, for example, a cost required for adding an IT resource according to the management policy 8*a*. For example, in the case where the management policy 8*a* defines the preparation time for the on-demand management to be 90 minutes, the preparation time for the best-effort management to be 90 minutes, and an amount of an IT resource to be added to be an amount corresponding to 5,000 accesses, the risk calculating part 29 can calculate an amount C of a management cost according to the management policy 8*a* using Expression 1 below.

$$C = O(90) + B(90) + S \times 5{,}000 \qquad \text{(Expression 1)}$$

Moreover, the risk calculating part 29 acquires acceptable amount data indicating a time-based transition of an acceptable number of accesses that is generated by the acceptable amount data generating part 20 (Step S43). The risk calculating part 29 performs a comparison between the acceptable number of accesses indicated by the acquired acceptable amount data and the number of accesses that can be handed according to the management policy 8*a* thereby to calculate the degree of the possibility that an unexpected number of accesses that cannot be handled by management according to the management policy 8*a* occur (Step S44).

Figure 18:
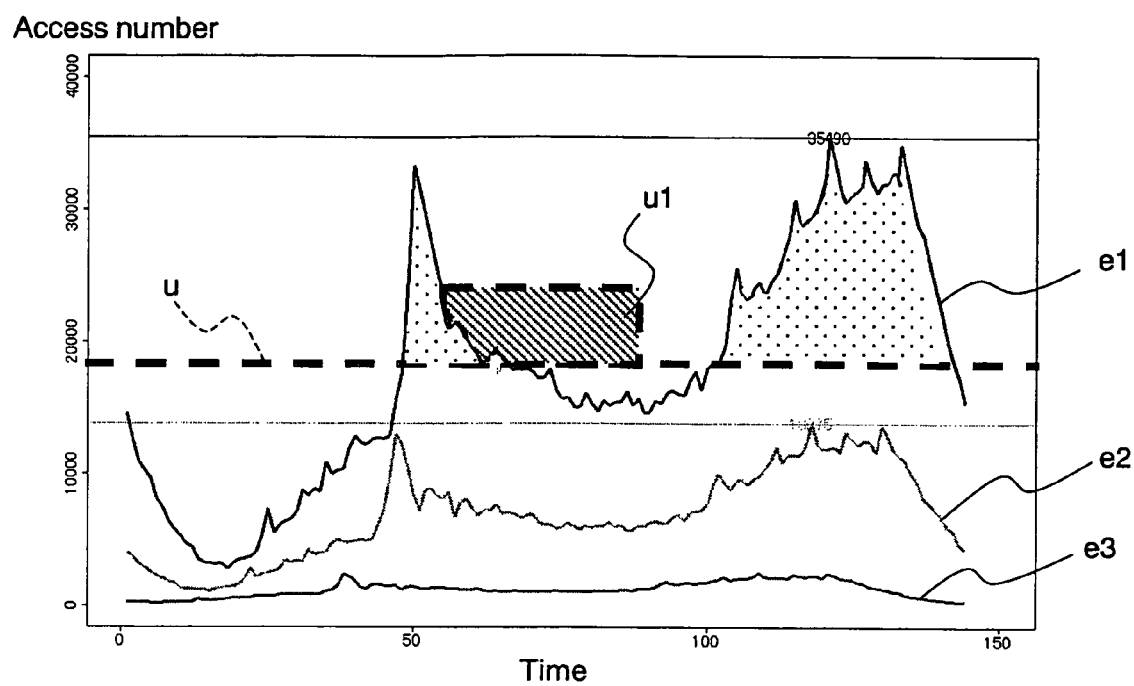
FIG. 18 is a graph in which an acceptable number of accesses indicated by the acceptable amount data and the number of accesses that can be handled by the addition of an IT resource, which is indicated by a management policy 8a, are shown as superimposed.

FIG. 18 is a graph in which an acceptable number of accesses indicated by the acceptable amount data and the number of accesses that can be handled by the addition of an IT resource, which is indicated by the management policy 8*a*, are shown as superimposed. In the graph shown in FIG. 18, vertical and horizontal axes indicate the number of accesses and a time, respectively. Lines e1, e2 and e3 represent time-based transitions of an acceptable number of accesses in the cases of the detection margin time $\Delta t = 120$, 90 and 60, respectively. A dashed line u in the graph represents the number of accesses that can be handled using the existing IT resources 16*a*. A region u1 enclosed by a dashed line represents a range of the number of accesses that is made acceptable by an IT resource to be added according to the management policy 8*a*.

Now, it is assumed that according to the management policy 8*a*, the preparation time for the on-demand management is 120 minutes and the preparation time for the best-effort management is 120 minutes. In an example shown in FIG. 18, in the case where an event variation such that the number of accesses has a peak falling in a region below the line e1 and above the dashed line u occurs, the event variation could not be handled even by the addition of an IT resource according to the management policy 8*a*. This is because when the IT resource is added after a lapse of the preparation time set in the management policy 8*a*, namely, after a lapse of 120 minutes, from the time when such an event variation is detected, the number of accesses has already peaked out.

The larger an area of a region of the number of accesses that cannot be handled according to a management policy such as the region lying below the line e1 and above the dashed line u shown in FIG. 18, the higher the possibility that a demand that cannot be met occurs. By determining an area of a region of the number of accesses that cannot be handled according to a management policy as in the above-described example, the risk calculating part 29 can calculate the degree of the possibility that unexpected accesses that cannot be handled according to the management policy 8*a* occur.

Using the degree of the possibility that accesses that cannot be handled according to the management policy 8*a* occur and the risk information 73, the risk calculating part 29 calculates a risk that a demand that cannot be met occurs as an amount of an opportunity loss (Step S45). For example, the risk calculating part 29 can calculate a risk that a demand that cannot be met occurs as an amount of an opportunity loss by multiplying an area of the region of the number of accesses that cannot be handled according to the management policy in the example shown in FIG. 18 by an appropriate coefficient. The coefficient is recorded in the risk information 73, for example.

In the example shown in FIG. 18, in the case where the preparation time for the on-demand management according to the management policy 8*a* is 90 minutes, any event variation could be handled by the addition of an IT resource. This is because, although a range of the number of accesses that cannot be handled in the preparation time of 90 minutes lies below the line e2, this range is included in the range of the number of accesses that can be handled using the existing IT resources 16*a*.

With respect to the management policy 8*a*, a management cost and a management risk are calculated in the above-described manner. Also with respect to each of other management policies of the company A, a management cost and a management risk are calculated in the same manner. Preferably, the management costs and the management risks calculated with respect to all the management policies of the company A are displayed so that they can be compared among the management policies.

Figure 19:
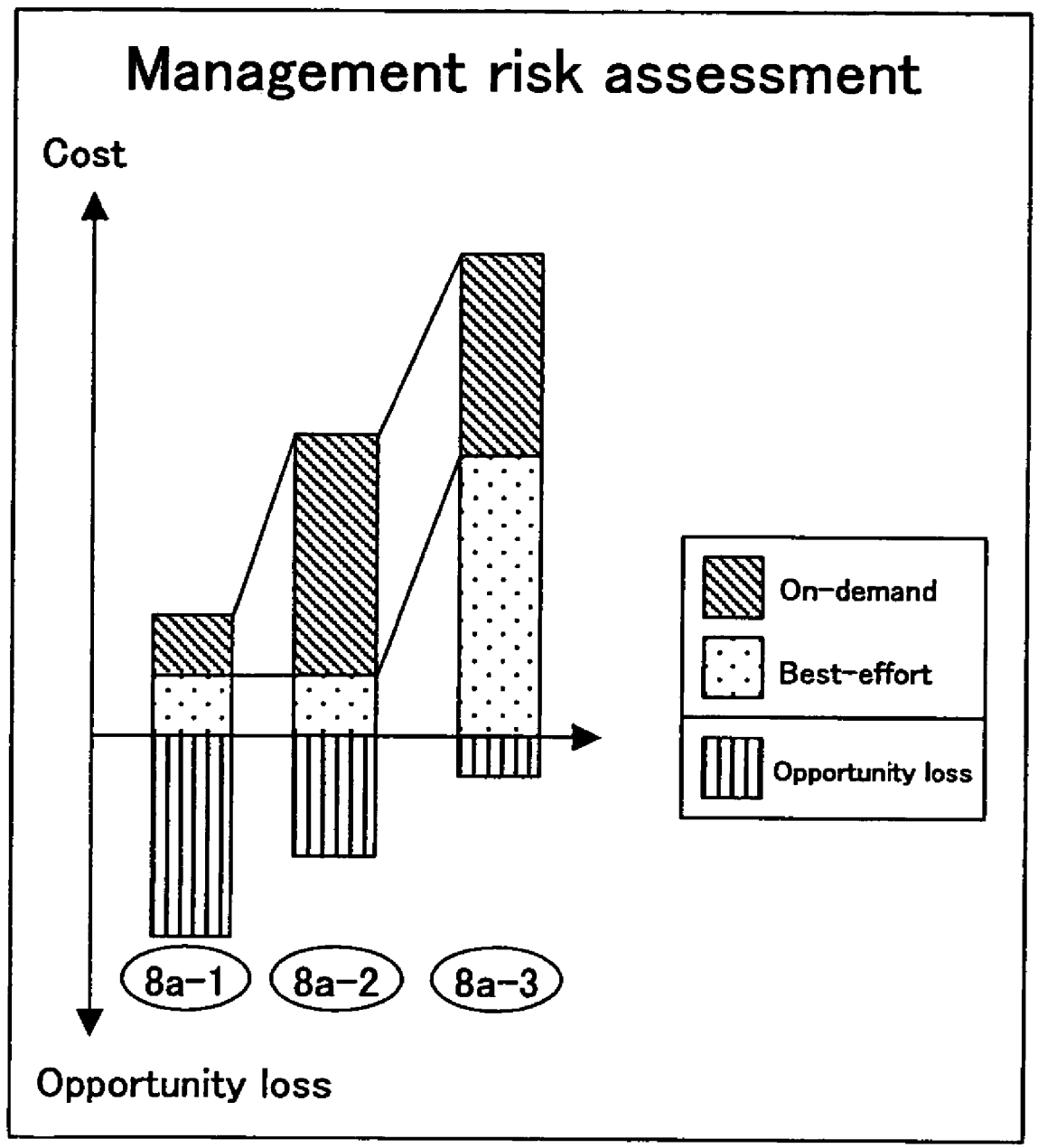
FIG. 19 is a diagram showing an example of a screen on which a management cost and a management risk that are determined with respect to each of different management policies 8a-1, 8a-2 and 8a-3 are shown so that they can be compared.

FIG. 19 is a diagram showing an example of a screen on which a management cost and a management risk that are determined with respect to each of different management policies 8a-1, 8a-2 and 8a-3 are shown so that they can be compared. In the example shown in FIG. 19, as the management cost according to each of the management policies 8a-1, 8a-2, and 8a-3, a management cost for the on-demand management and a management cost for the best-effort management are displayed so that they can be identified. Further, management risks due to an opportunity loss are displayed separately from the management costs. By viewing the screen shown in FIG. 19, the manager of the company A can obtain guidelines for selecting an optimum management policy.

(Example of a Process of Generating an Unexpected Demand Model Using Acceptable Amount Data)

Figure 20:
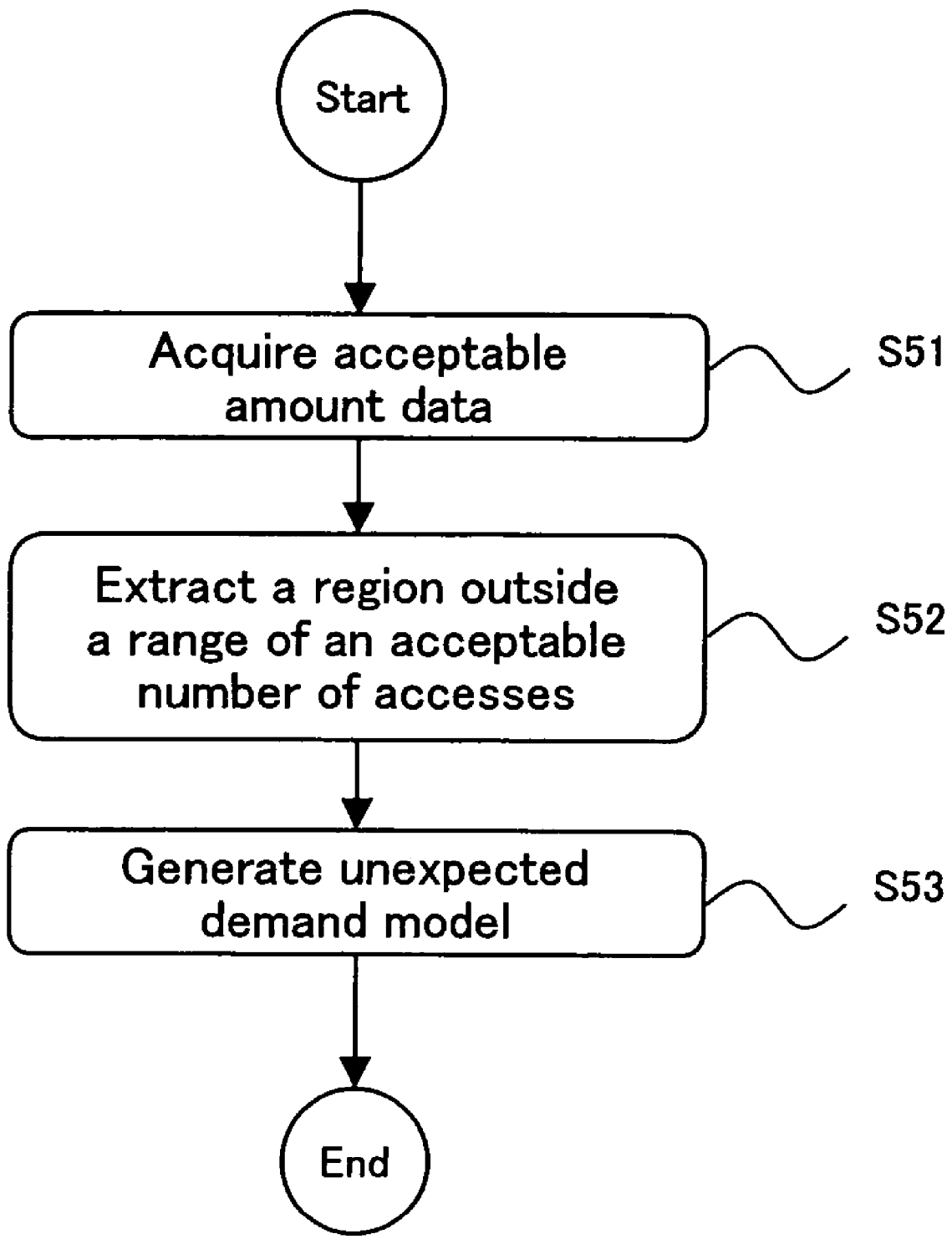
FIG. 20 is a flowchart showing an example of a process in which an unexpected demand model generating part 13 generates an unexpected demand model 52.

The description is directed next to an example of a process of generating an unexpected demand model using acceptable amount data. FIG. 20 is a flowchart showing an example of a process in which the unexpected demand model generating part 13 generates the unexpected demand model 52. First, the unexpected demand model generating part 13 acquires acceptable amount data generated by the acceptable amount data generating part 20 (Step S51).

Using the acceptable amount data, the unexpected demand model generating part 13 extracts a region that lies outside a range of the number of accesses that can be handled in a predetermined detection margin time (Step S52). The predetermined detection margin time used herein can be, for example, the detection margin time 33 prerecorded in the company information recording part 27. The following describes a case where the predetermined detection margin time is 120 minutes.

Figure 21:
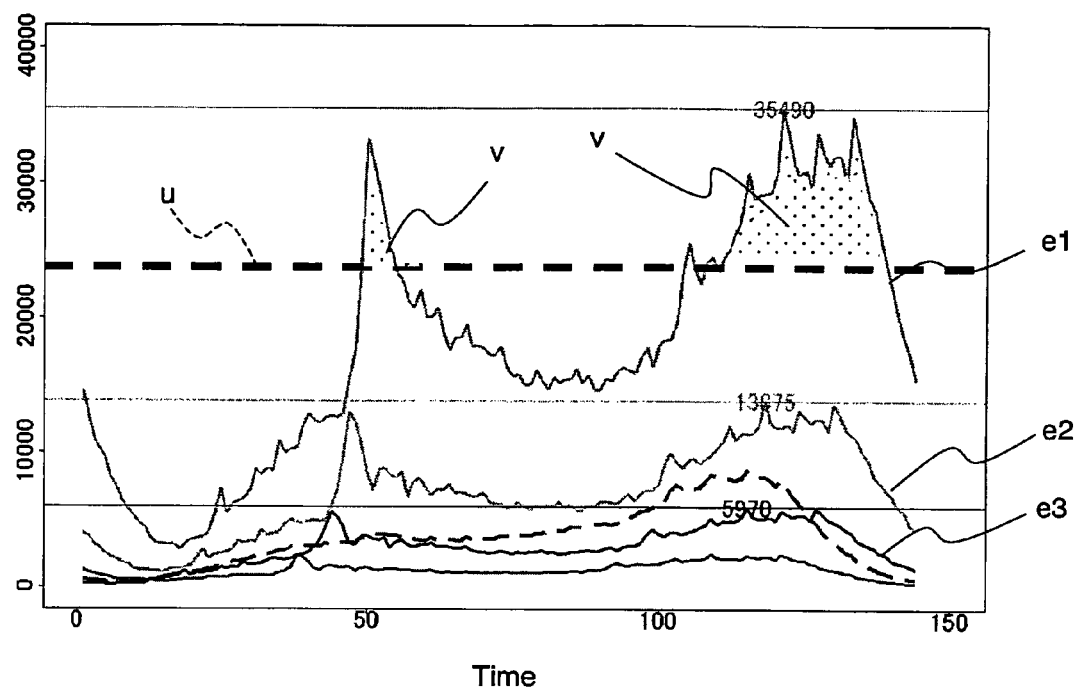
FIG. 21 is a graph showing a range of an acceptable number of accesses indicated by acceptable amount data acquired by the unexpected demand model generating part 13.

FIG. 21 is a graph showing a range of the acceptable number of accesses indicated by the acceptable amount data acquired by the unexpected demand model generating part 13. In the graph shown in FIG. 21, vertical and horizontal axes indicate the number of accesses and a time, respectively. Lines e1, e2 and e3 represent time-based transitions of an acceptable number of accesses in the cases of the detection margin time Δt=120, 90 and 60, respectively.

In the graph, a dashed line u represents the number of accesses that can be handled using the existing IT resources 16a. Accordingly, a range that lies below the dashed line u is a range of an acceptable number of accesses. Further, in the case where the detection margin time is 120 minutes, a range that lies above the dashed line u and above the line e1 is a range such that an additional IT resource can be prepared in 120 minutes and thus is a range of an acceptable number of accesses.

In the example shown in FIG. 20, the unexpected demand model generating part 13 extracts, as the region outside the range of the acceptable number of accesses, a region v that lies above the dashed line u and below the line e1.

The unexpected demand model generating part 13 generates the unexpected demand model 52 that represents a time-based transition of the number of accesses whose peak falls in the region v outside the range of the acceptable number of accesses (Step S53). In an example shown in FIG. 21, the unexpected demand model 52 is generated that represents a time-based transition of the number of accesses whose peak falls in a range that lies above the dashed line u and below the line e1. That is, the unexpected demand model 52 is generated that represents a time-based transition of the number of accesses that cannot be handled if an IT resource is added at a lapse of 120 minutes from the time when an event variation is detected. When the unexpected demand model 52 such that a peak falls in a range outside the range of the acceptable number of accesses is generated in this manner, the judging part 2 can judge whether a demand occurs that has a peak falling in a range outside the range of the acceptable number of accesses and thus is highly risky.

Embodiment 3

This embodiment relates to an unexpected demand detection system for detecting an unexpected demand for, for example, each of the IT resources 16a, 16b and 16c of the companies A, B and C in the IDC 24 shown in FIG. 1A. This embodiment describes as an example a case where an unexpected demand for the IT resources 16a of the company A is detected.

Figure 22:
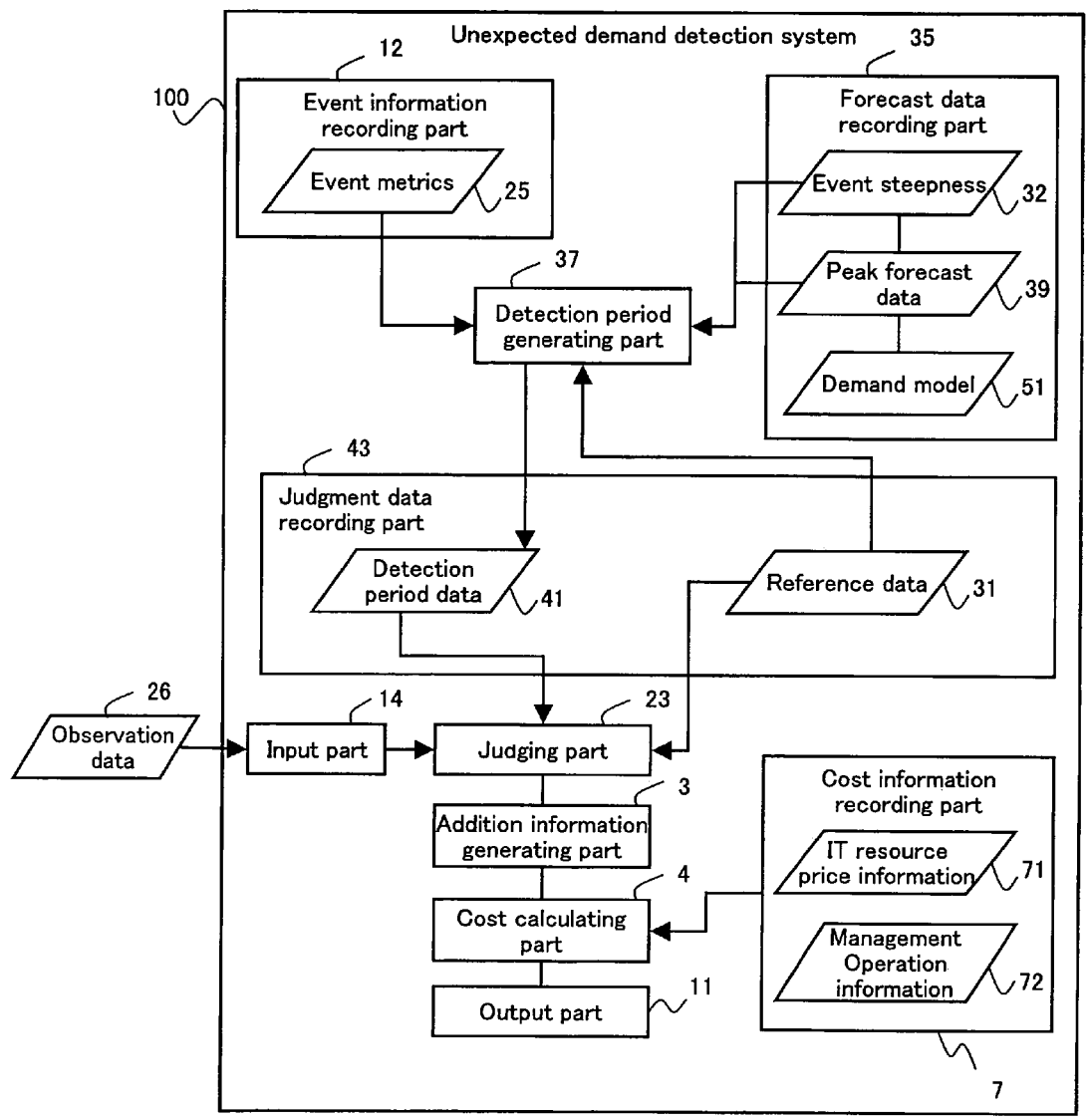
FIG. 22 is a functional block diagram showing a configuration of an unexpected demand detection system 100.

FIG. 22 is a functional block diagram showing a configuration of an unexpected demand detection system 100 according to this embodiment. The unexpected demand detection system 100 includes a detection period generating part 37, a judging part 23, an addition information generating part 3, a cost calculating part 4, an output part 11, an input part 14, a forecast data recording part 35, an event information recording part 12, a judgment data recording part 43, and a cost information recording part 7.

In the forecast data recording part 35, event steepness 32, peak forecast data 39, and a demand model 51 are recorded. Preferably, the event steepness 32, the peak forecast data 39, and the demand model 51 are recorded with respect to each of the IT resources 16a, 16b and 16c that are managed in the IDC 24. That is, preferably, in the forecast data recording part 35, data unique to each of the companies A, B and C that manage the business systems in the IDC 24 is recorded.

Similarly to the demand model 51 in Embodiment 1, the demand model 51 is data indicating a time-based transition in a predetermined time period of an amount of the IT resources required in each of the business systems constituted by the IT resources 16a, 16b and 16c, respectively. Further, preferably, the demand model 51 contains data indicating steepness of the above-described time-based transition. Similarly to the event steepness 32 in Embodiment 2, the steepness is, for example, data indicating a speed at which the number of accesses varies due to the occurrence of an event such as a campaign run by the company A.

The peak forecast data 39 contains, for example, data indicating a time period in a predetermined time period, in which a peak of a demand for the IT resources 16a that varies due to an event envisioned by the company A is reached and a demand amount at a peak time. The peak forecast data 39 may be calculated base on the demand data 51, for example.

The event steepness 32 is, for example, data indicating steepness of a variation in demand for the IT resources 16a due to an event envisioned by the company A. For example, the event steepness 32 may be recorded as data contained in the demand model 51 or may be recorded in the forecast data recording part 35 as data separate from the demand model 51.

Using the event steepness 32 and the peak forecast data 39, the detection period generating part 37 acquires, from event metrics 25 recorded in the event information recording part 12, a demand amount at a point in time preceding the peak time indicated by the peak forecast data 39 by a fixed detection margin time. The event information recording part 12 and the event metrics 25 are the same as the event information recording part 12 and the event metrics 25 in Embodiment 2.

The detection period generating part 37 performs a comparison between the demand amount acquired from the event metrics 25 and reference value data 31 recorded in the judgment data recording part 43 thereby to calculate a detection period in which a start of the variation in demand due to the event envisioned by the company A is detected. The calculated detection period is recorded in the judgment data recording part 43 as detection period data 41. Preferably, also in the judgment data recording part 43, data unique to each of the companies A, B and C is recorded.

The judging part 23 performs a comparison between an actual demand indicated by observation data 26 inputted in the input part 14 and the reference value data 31 thereby to detect a start of a variation in demand due to an actual event. The judging part 23 performs a comparison between a time period in which the start is detected from the observation data 26 and the detection period data 41 calculated by the detection period generating part 37 thereby to judge whether a demand different from a demand indicated by the data recorded in the forecast data recording part 35 actually occurs in a predetermined time period indicated by the reference value data 31.

The input part 14, the addition information generating part 3, the cost calculating part 4, the output part 11, and the cost information recording part 7 are the same as in Embodiment 1 and thus descriptions thereof are omitted. Further, in a hardware configuration of the unexpected demand detection system 100, a computer of the same type as used in Embodiment 1 also can be used. For example, a CPU of a computer executes a predetermined program, so that the functions of the detection period generating part 37, the judging part 23, the addition information generating part 3, the cost calculating part 4, the output part 11, the unexpected demand model generating part 13, and the input part 14 are implemented. Further, the forecast data recording part 35, the event information recording part 12, the judgment data recording part 43, and the cost information recording part 7 can be formed of a recording medium provided in a computer or a recording medium connected to a computer.

(Example of a Process of Generating Detection Period Data)

Figure 23:
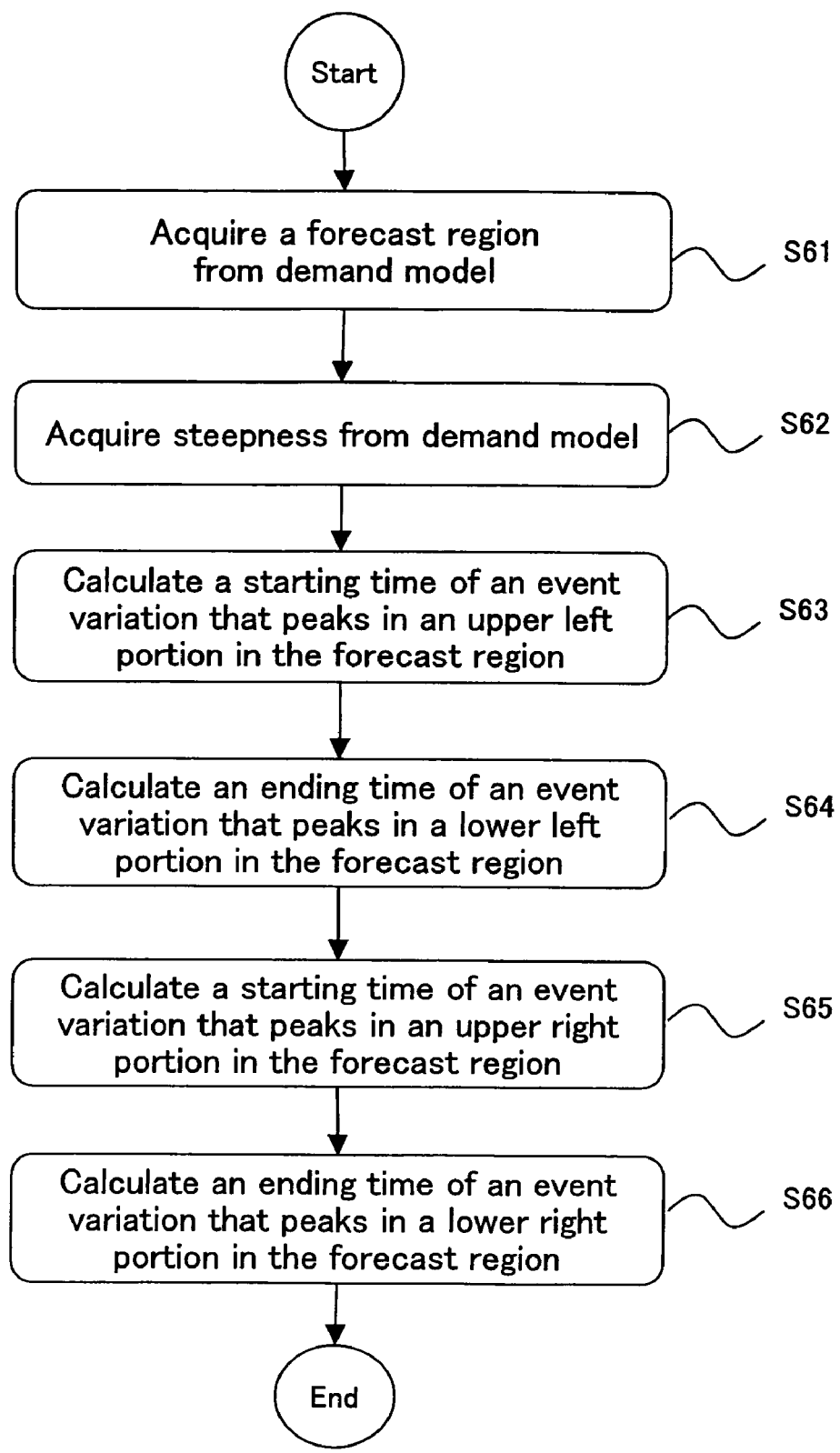
FIG. 23 is a flowchart showing an example of a process in which a detection period generating part 37 generates detection period data 41.

The description is directed next to an example of a process in which the detection period generating part 37 generates the detection period data 41. FIG. 23 is a flowchart showing an example of the process in which the detection period generating part 37 generates the detection period data 41. First, based on the demand model 51, the detection period generating part 37 determines ranges of a peak period and a peak value of a demand for the IT resources 16a that varies due to an event (Step S61).

As an example, the following describes a case where a demand for the IT resources 16a is represented in terms of the number of accesses. For example, in a transition of the number of accesses represented by the demand model 51, with respect to a peak value of 10,000 accesses, a range of the peak value can be defined by values obtained by increasing and decreasing the peak value by 1,000. Further, for example, in the case where a time period at which a peak of the number of accesses represented by the demand model 51 is reached is 20:00, a range of the peak period can be defined by times preceding and following 20:00 by one hour.

Figure 24:
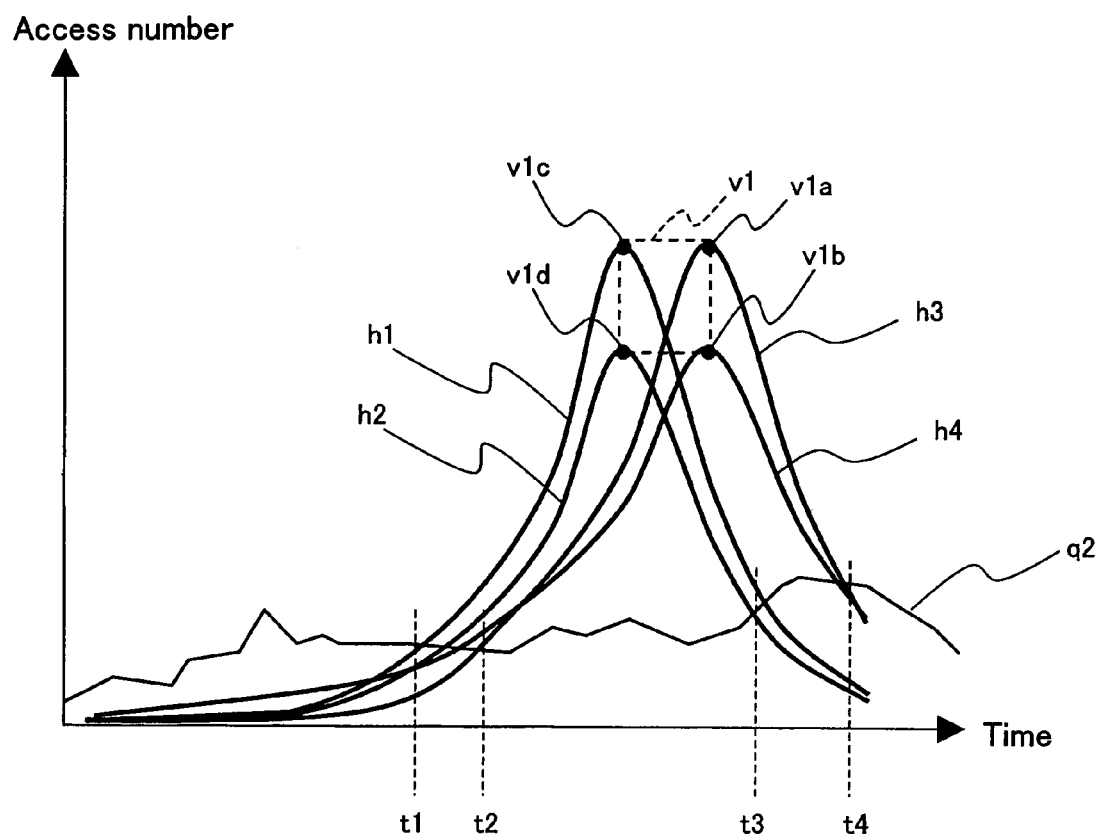
FIG. 24 is a graph showing an example of forecast region data and a demand forecast model.

Hereinafter, data indicated by ranges of a peak period and a peak value is referred to as forecast region data. FIG. 24 is a graph showing an example of forecast region data and a demand forecast model. In the graph, a region v1 enclosed by a dashed line is a forecast region v1 indicated by the forecast region data. In the graph shown in FIG. 24, vertical and horizontal axes indicate the number of accesses and a time, respectively. A line q2 represents a time-based transition of a standard deviation of the number of accesses indicated by the reference value data 31.

Next, the detection period generating part 37 acquires steepness s1 extracted from the demand model 51 (Step S62). Using the acquired steepness s1, the detection period generating part 37 calculates a starting time of a variation in number of accesses due to an event, which peaks at a point v1c in an upper left portion of the forecast region v1 (Step S63). The upper left point v1c of the forecast region v1 is a point representing a case where in the forecast region v1, a highest peak value is obtained at an earliest peak time.

In Step S63, the detection period generating part 37 acquires a multiplication factor $\alpha1$ that corresponds to the steepness s1 acquired in Step S62 and a predetermined detection margin time $\Delta t$ from, for example, the event metrics 25 shown in FIG. 13. By multiplying the peak value at the upper left point v1c by an inverse of the multiplication factor $\alpha1$, the detection period generating part 37 can obtain an access number at a point in time preceding the peak at the upper left point v1c by $\Delta t$. For example, by a comparison between this access number and a standard deviation at the point in time preceding the peak at the upper left point v1c by $\Delta t$, it is determined whether a variation due to an event has been started at that point in time. The detection period generating part 37 can determine a starting time of a variation in number of accesses due to an event by performing such a comparison with respect to a plurality of values of $\Delta t$.

With respect to each of a plurality of values of $\Delta t$, the detection period generating part 37 acquires an access number at a point in time deviating from the peak at the upper left point v1c by $\Delta t$ from the event metrics 25, and thus can obtain data indicating a variation in number of accesses due to an event such as, for example, represented by a curve h1 shown in FIG. 24. For example, among times at which this curve h1 intersects with the line q2 representing the standard deviation indicated by the reference value data 31, the detection period generating part 37 can determine an earlier time to be a starting time of a variation in number of accesses due to an event and a later time to be an ending time of the variation. That is, by the detection period generating part 37, the starting time of the variation in number of accesses due to the event, which peaks at the upper left point v1c in the forecast region v1 and is represented by the curve h1, can be determined to be a time t1.

In the same manner, the detection period generating part 37 calculates an ending time t3 of a variation in number of accesses due to an event, which peaks at a lower left point v1d in the forecast region v1 (curve h2) (Step S64). Further, the detection period generating part 37 calculates a starting time t2 of a variation in number of accesses due to an event, which peaks at an upper right point v1a in the forecast region v1 (curve h3) (Step S65). Moreover, the detection period generating part 37 calculates an ending time t4 of a variation in number of accesses due to an event, which peaks at a lower right point v1b in the forecast region v1 (curve h4) (Step S63).

The detection period generating part 37 can determine a range of the starting time between t1 to t2 and a range of the ending time between t3 to t4 in this manner. These values t1 to t4 are recorded in the judgment data recording part 43 as the detection period data 41.

In the above-described example, the process of determining starting and ending times of event variations that peak at the upper left point v1c, the lower left point v1d, the upper right point v1a, and the lower right point v1b in the forecast region v1, respectively, is explained. However, there is no limitation to these four points, and starting and ending times of, for example, event variations that peak at other points in the forecast region v1 also may be determined.

(Example of a Process of Judging Whether an Unexpected Demand Occurs)

Figure 25:
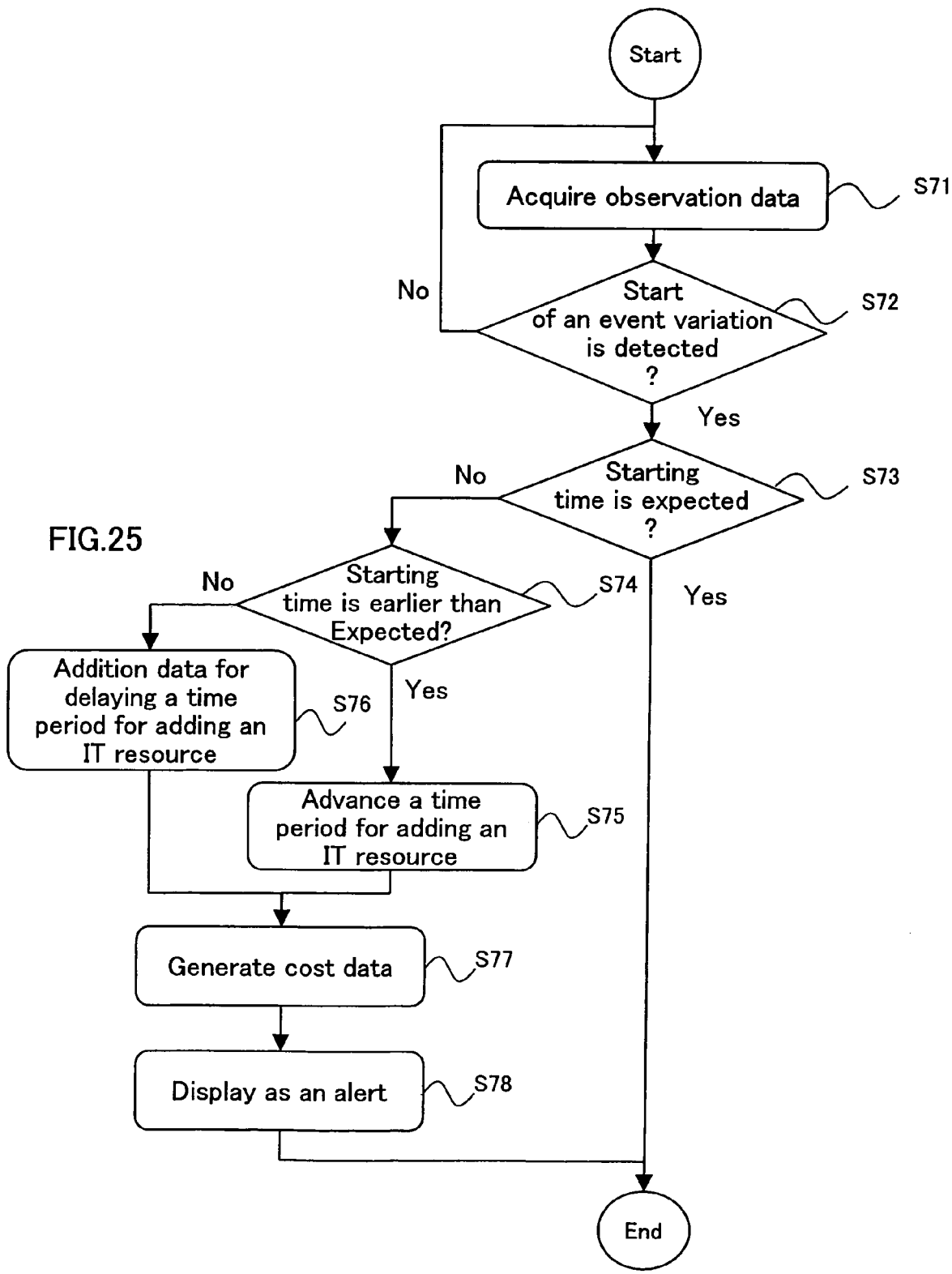
FIG. 25 is a flowchart showing an example of a process in which a judging part 23 judges whether an unexpected demand occurs.

The description is directed next to an example of a process in which the judging part 23 judges whether an unexpected demand occurs using the detection period data 41. FIG. 25 is a flowchart showing an example of the process in which the judging part 23 judges whether an unexpected demand occurs.

First, by the input part 14, the observation data 26 is inputted (Step S71). The observation data 26 is the same as in Embodiment 1. This embodiment describes as an example a case where data indicating the number of accesses to the server of the IT resources 16a of the company A shown in FIG. 1 is inputted as the observation data 26. For example, preferably, the number of accesses to the server obtained at a regular time interval is inputted successively by the input part 14.

The judging part 23 performs a comparison between the number of accesses indicated by the observation data 26 and the reference value data 31 thereby to judge whether a variation in number of accesses due to an event is started (Step S72). For example, in the case where the number of accesses at a certain time indicated by the observation data 26 exceeds a standard deviation of the number of accesses at that time, the judging part 23 can determine that a variation in number of accesses due to an event is started.

The judging part 23 performs a comparison between the time at which the variation in number of accesses due to the event is started and the starting time indicated by the detection period data 41 thereby to determine whether the time at which the variation in number of accesses is started has been expected (Step S73).

Figure 26A:
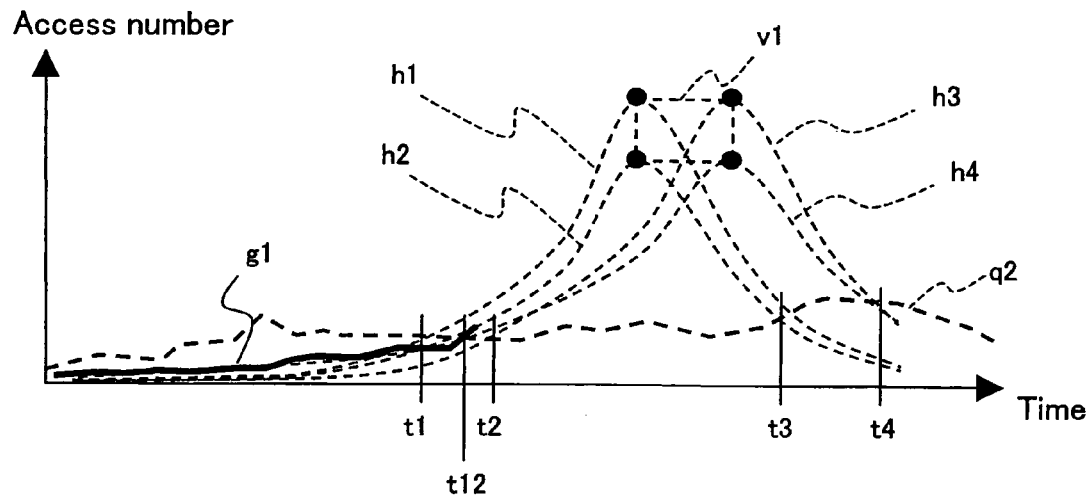
FIGS. 26A and 26B are graphs showing examples of a transition of the number of accesses indicated by observation data 26 and examples of a forecast region.
Figure 26B:
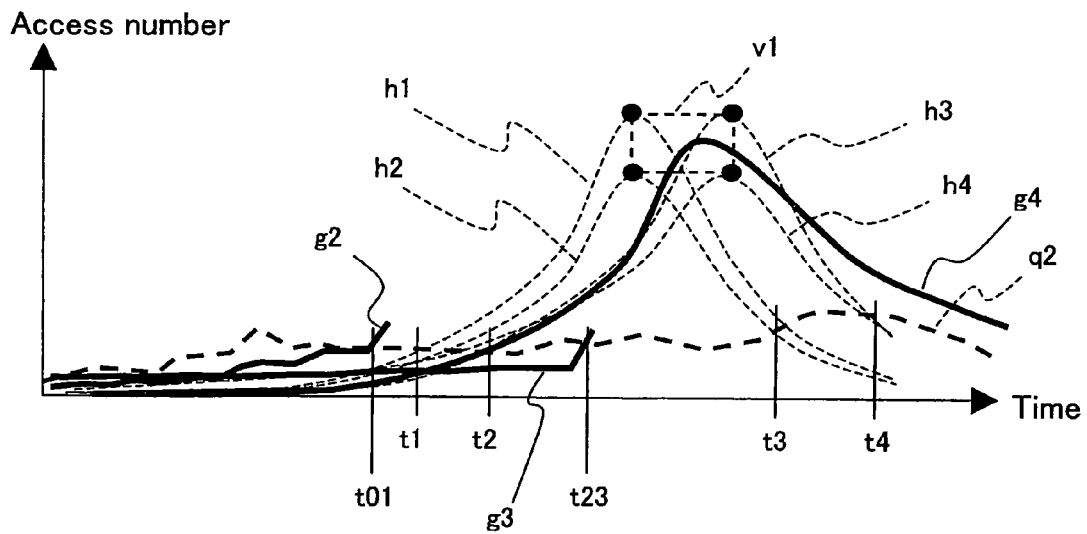

FIGS. 26A and 26B are graphs showing examples of a transition of the number of accesses indicated by the observation data 26 and examples of a forecast region. In each of the graphs shown in FIGS. 26A and 26B, vertical and horizontal axes indicate the number of accesses and a time, respectively. Further, a region v1 enclosed by a dotted line is the forecast region v1 shown in FIG. 24, and curves h1, h2, h3 and h4 in the graphs are the curves h1, h2, h3 and h4 shown in FIG. 24, respectively.

In FIG. 26A, a line g1 represents an example of a transition of the number of accesses indicated by the observation data 26. The number of accesses represented by the line g1 exceeds a standard deviation represented by a line q2 at a time t12. The judging part 23 thus detects a start of an event variation in the number of accesses at the time t12. The time t12 falls in the range of the starting time determined in the detection period generating part 37, namely, in the range between the time t1 and t2. Therefore, it is determined that the start of the event variation in the transition of the number of accesses represented by the line g1 has been expected (Yes in Step S73). That is, the judging part 23 judges that the number of accesses indicated by the observation data 26 makes a transition such that a peak of the number of accesses falls in the forecast region v1.

In FIG. 26B, a line g2 represents another example of the transition of the number of accesses indicated by the observation data 26. The number of accesses represented by the line g2 exceeds a standard deviation represented by a line q2 at a time t01. The time t01 falls outside the range of the starting time determined in the detection period generating part 37. That is, the time t01 is earlier than the time t1.

In this case, the judging part 23 determines that a start of an event variation in the transition of the number of accesses represented by the line g2 is unexpected (No in Step S73) and is earlier than expected (Yes in Step S74). That is, the judging part 23 judges that the number of accesses indicated by the observation data 26 makes a transition such that a peak of the number of accesses is reached outside the forecast region v1.

When the judging part 23 determines that the start of the event variation is earlier than expected (Yes in Step S74), the addition information generating part 3 can generate, for example, additional IT resource information in which a time period for adding an IT resource is set to be earlier so as to correspond to the start of the event variation that is earlier than expected (Step S75).

In FIG. 26B, a line g3 represents still another example of the transition of the number of accesses indicated by the observation data 26. The number of accesses represented by the line g3 exceeds a standard deviation represented by the line q2 at a time t23. The time t23 falls outside the range of the starting time determined in the detection period generating part 37. That is, the time t23 is later than the time t2. In this case, the judging part 23 determines that a start of an event variation in the transition of the number of accesses represented by the line g3 is unexpected (No in Step 73) and is later than expected (No in Step S74).

When the judging part 23 determines that the start of the event variation is later than expected (No in Step S74), the addition information generating part 3 can generate, for example, additional IT resource information in which a time period for adding an IT resource is set to be later so as to correspond to the start of the event variation that is later than expected (Step S76).

Using data recorded in the cost information recording part 7, the cost calculating part 4 calculates a cost for adding an IT resource indicated by the additional IT resource information that is generated by the addition information generating part 3 (Step S77). The detail of the process of Step S77 is the same as those of Steps S6 and S7 illustrated in FIG. 3.

By the output part 11, the result of the judgment by the judging part 23, the additional IT resource information generated in Step S75 or Step S76, and the cost calculated in Step S77 are displayed on, for example, the display (not shown) of the terminal of the company A (Step S78).

Thus, in the case where an event variation in the number of accesses is started earlier than expected (Yes in Step S74), the company A can determine whether a time period for adding an IT resource should be brought forward. Further, in the case where an event variation in the number of accesses is started later than expected (No in Step S74), the company A can be notified that over-investment may result from the addition of an IT resource to be added.

The flowchart shown in FIG. 25 illustrates an example of a process in which the judging part 23 judges a starting time of an event variation. Similarly, it also can be judged whether an ending time of an event variation is unexpected.

For example, a line g4 in FIG. 26B represents yet still another example of the transition of the number of accesses indicated by the observation data 26. Even at a time t4, the number of accesses represented by the line g4 still exceeds a standard deviation represented by the line q2. The time t4 falls on the end of the range of the ending time determined in the detection period generating part 37. That is, even at the time t4, an event variation in the number of accesses represented by the line g4 has not been ended yet. In this case, the judging part 23 can determine that the end of the event variation in the number of accesses represented by the line g4 is unexpected and is later than expected.

Such a result of the judgment on an ending time of an event variation by the judging part 23 also can be displayed by the output part. Thus, for example, in the case where an event variation is ended earlier than expected, the company A can determine whether an IT resource that has been added should be freed at an earlier time. Further, in the case where an event variation has not been ended even at an expected ending time, the company A can determine whether an IT resource that has been added should be freed at a later time.

The present invention is useful as an unexpected demand detection system that can improve the use efficiency of IT resources in an IDC, for example.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. An unexpected demand detection system for detecting an unexpected demand for IT resources that can be increased/decreased in a computer system including the IT resources, comprising:

an event information recording part that records a value indicating a ratio between, with respect to a demand for the IT resources that varies due to occurrence of an event, a demand amount at a time when a peak of the demand is reached and a demand amount at a point in time preceding or following the peak time by a length of a detection margin time correspondingly to a plurality of values indicating steepness of a variation in the demand for the IT resources and a plurality of lengths of the detection margin time;

a reference value data recording part that records reference value data indicating a time-based transition in a predetermined time period of a reference value for judging presence or absence of a variation in the demand for the IT resources due to occurrence of an event;

a forecast data recording part that records forecast data containing data indicating a value of the steepness of a variation in the demand for the IT resources due to an envisioned event and data indicating a time period in the predetermined time period, in which a peak of the demand for the IT resources that varies due to the envisioned event is reached, and a demand amount at a peak time;

a detection period generating part that acquires, using the value of the steepness, the time period in which the peak of the demand is reached, and the demand amount at the peak time that are indicated by the forecast data, a demand amount at a point in time preceding the peak time by a length of the detection margin time from the event information recording part, and performs a comparison between the acquired demand amount and the reference value data thereby to calculate a detection period in which a start of the variation in the demand due to the envisioned event is detected;

an observation data input part that inputs observation data indicating an actual demand for the IT resources observed in the predetermined time period; and a judging part that performs a comparison between the actual demand indicated by the observation data and the reference value data so as to detect a start of a variation in the demand due to an event, and performs a comparison between a time period in which the start is detected and the detection period calculated by the detection period generating part thereby to judge whether a demand different from the demand indicated by the forecast data occurs in the predetermined time period.

2. A recording medium in which an unexpected demand detection program for allowing a computer to perform a process of detecting an unexpected demand for IT resources that can be increased/decreased in a computer system including the IT resources is recorded, the unexpected demand detection program allowing the computer to perform:

a reference value data reading process of reading out, from a recording part provided in the computer, reference value data indicating a time-based transition in a predetermined time period of a reference value for judging presence or absence of a variation in a demand for the IT resources due to occurrence of an event;

a forecast data reading process of reading out, from the recording part, forecast data containing data indicating a value of steepness of a variation in the demand for the IT resources due to an envisioned event and data indicating a time period in the predetermined time period, in which a peak of the demand for the IT resources that varies due to the envisioned event is reached, and a demand amount at a peak time;

an acquiring process of accessing an event information recording part in which a value indicating a ratio between, with respect to the demand for the IT resources that varies due to occurrence of an event, a demand amount at a time when a peak of the demand is reached and a demand amount at a point in time preceding or following the peak time by a length of a detection margin time is recorded correspondingly to a plurality of values indicating the steepness of a variation in the demand for the IT resources and a plurality of lengths of the detection margin time thereby to acquire, using the value of the steepness, the time period in which the peak of the demand is reached, and the demand amount at the peak time that are indicated by the forecast data, a demand amount at a point in time preceding the peak time by a length of the detection margin time from the event information recording part;

a detection period generating process of performing a comparison between the demand amount acquired in the acquiring process and the reference value data thereby to calculate a detection period in which a start of the variation in the demand due to the envisioned event is detected;

an observation data inputting process of inputting observation data indicating an actual demand for the IT resources observed in the predetermined time period; and a judging process of performing a comparison between the actual demand indicated by the observation data and the reference value data so as to detect a start of a variation in the demand due to an event, and performing a comparison between a time period in which the start is detected and the detection period calculated in the detection period generating process thereby to judge whether a demand different from the demand indicated by the forecast data occurs in the predetermined time period.

* * * * *